(12) United States Patent
Droger et al.

(10) Patent No.: US 10,941,329 B2
(45) Date of Patent: Mar. 9, 2021

(54) SLURRY COMPRISING AN ENCAPSULATED EXPANSION AGENT FOR WELL CEMENTING

(71) Applicant: SCHLUMBERGER TECHNOLOGY CORPORATION, Sugar Land, TX (US)

(72) Inventors: Nicolas Droger, Clamart (FR); Mickael Allouche, Clamart (FR); Katia Dennis, Clamart (FR); Sylwia Komocki, Clamart (FR)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/091,778

(22) PCT Filed: Apr. 10, 2017

(86) PCT No.: PCT/EP2017/000492
§ 371 (c)(1),
(2) Date: Oct. 5, 2018

(87) PCT Pub. No.: WO2017/174208
PCT Pub. Date: Oct. 12, 2017

(65) Prior Publication Data
US 2019/0161669 A1  May 30, 2019

(30) Foreign Application Priority Data

Apr. 8, 2016  (EP) .................................... 16305415
Apr. 8, 2016  (EP) .................................... 16305416
Apr. 18, 2016 (EP) .................................... 16305449

(51) Int. Cl.
*E21B 33/14*  (2006.01)
*C09K 8/473* (2006.01)
(Continued)

(52) U.S. Cl.
CPC .......... *C09K 8/473* (2013.01); *C04B 20/1037* (2013.01); *C04B 20/1051* (2013.01);
(Continued)

(58) Field of Classification Search
None
See application file for complete search history.

(56) References Cited

U.S. PATENT DOCUMENTS 1,265,655 A   5/1918  Henderson
1,344,461 A   6/1920  Thomas et al.
(Continued)

FOREIGN PATENT DOCUMENTS

CN  104692694 A   6/2015
DE    3704783 A1  8/1988
(Continued)

OTHER PUBLICATIONS

Extended European Search Report issued in European Patent Appl. No. 16305415.8 dated Oct. 12, 2016; 5 pages.
(Continued)

*Primary Examiner* — Andrew Sue-Ako
(74) *Attorney, Agent, or Firm* — Cameron Sneddon

(57) ABSTRACT

Methods to prepare a well cementing slurry include coating particles comprising an expanding agent with a component selected from the group consisting of a phenolic resin, a silica, a calcination product of a polysiloxane oil, and a combination thereof; and combining the coated particles with mix water and hydraulic cement to form a cement slurry for cementing a well.

17 Claims, 8 Drawing Sheets

(51) Int. Cl.
- *C04B 28/02* (2006.01)
- *C04B 20/10* (2006.01)
- *C09K 8/467* (2006.01)
- *C04B 40/06* (2006.01)
- *C04B 22/06* (2006.01)
- *C04B 111/34* (2006.01)
- *C04B 111/40* (2006.01)

(52) U.S. Cl.
CPC ...... *C04B 20/1074* (2013.01); *C04B 20/1085* (2013.01); *C04B 22/064* (2013.01); *C04B 22/066* (2013.01); *C04B 28/02* (2013.01); *C04B 40/0633* (2013.01); *C09K 8/467* (2013.01); *E21B 33/14* (2013.01); *C04B 2111/34* (2013.01); *C04B 2111/40* (2013.01)

(56) References Cited

U.S. PATENT DOCUMENTS

| | | |
|---|---|---|
| 1,394,273 A | 10/1921 | Carrier et al. |
| 1,852,696 A | 4/1932 | Chaffee et al. |
| 2,465,278 A | 3/1949 | Schenker et al. |
| 3,221,548 A | 12/1965 | Wilson et al. |
| 3,265,151 A | 8/1966 | Anderson et al. |
| 3,303,461 A | 2/1967 | Edwards et al. |
| 3,308,426 A | 3/1967 | Wilson et al. |
| 3,691,518 A | 9/1972 | Schuster et al. |
| 3,696,884 A | 10/1972 | Lafleur et al. |
| 3,811,529 A | 5/1974 | Crawford |
| 3,884,710 A | 5/1975 | Allen et al. |
| 3,952,741 A | 4/1976 | Baker |
| 4,002,483 A | 1/1977 | Daugherty et al. |
| 4,205,994 A | 6/1980 | Moyer, Jr. et al. |
| 4,255,798 A | 3/1981 | Havira |
| 4,328,038 A | 5/1982 | Briggs |
| 4,332,619 A | 6/1982 | Gandy et al. |
| 4,391,329 A | 7/1983 | Gallus |
| 4,419,136 A | 12/1983 | Rice |
| 4,495,606 A | 1/1985 | Smith |
| 4,607,698 A | 8/1986 | Wood |
| 4,741,401 A | 5/1988 | Walles et al. |
| 4,757,479 A | 7/1988 | Masson et al. |
| 4,797,159 A | 1/1989 | Spangle |
| 4,871,179 A | 10/1989 | Bell et al. |
| 4,893,285 A | 1/1990 | Masson et al. |
| 4,986,354 A | 1/1991 | Cantu et al. |
| 5,118,527 A | 6/1992 | Wilson |
| 5,275,654 A | 1/1994 | Cowan |
| 5,650,004 A | 7/1997 | Yon |
| 5,741,357 A | 4/1998 | Sheikh |
| 5,942,031 A | 8/1999 | Cheung |
| 6,015,622 A | 1/2000 | Boe |
| 6,105,673 A | 8/2000 | Harris et al. |
| 6,209,646 B1 | 4/2001 | Reddy et al. |
| 6,675,895 B1 | 1/2004 | Shehab et al. |
| 6,743,470 B2 | 6/2004 | Pellerite et al. |
| 6,909,969 B2 | 6/2005 | Calvert et al. |
| 6,966,376 B2 | 11/2005 | Vaeth et al. |
| 7,150,317 B2 | 12/2006 | Barolak et al. |
| 7,156,174 B2 | 1/2007 | Roddy et al. |
| 7,494,544 B2 | 2/2009 | Go Boncan |
| 7,525,872 B2 | 4/2009 | Tang et al. |
| 7,663,969 B2 | 2/2010 | Tang et al. |
| 7,670,627 B2 | 3/2010 | Shefer et al. |
| 7,712,530 B1 | 5/2010 | Edgley et al. |
| 7,722,954 B2 | 5/2010 | Santra et al. |
| 7,773,454 B2 | 8/2010 | Barolak et al. |
| 7,988,782 B2 | 8/2011 | Rice et al. |
| 8,157,008 B2 | 4/2012 | Lilley |
| 8,273,426 B1 * | 9/2012 | Laramay ............... A01N 25/26 428/35.7 |
| 8,336,620 B2 | 12/2012 | Williams et al. |
| 2001/0026863 A1 | 10/2001 | Hirano et al. |
| 2002/0037306 A1 | 3/2002 | Van Koppenhagen et al. |
| 2002/0166698 A1 | 11/2002 | Beato et al. |
| 2003/0156494 A1 | 8/2003 | McDaniel et al. |
| 2003/0216866 A1 | 11/2003 | Edward Calvert et al. |
| 2004/0109894 A1 | 6/2004 | Shefer et al. |
| 2004/0147406 A1 * | 7/2004 | Go Boncan ............ C09K 8/473 507/200 |
| 2004/0168801 A1 | 9/2004 | Reddy et al. |
| 2004/0234597 A1 | 11/2004 | Shefer et al. |
| 2005/0123596 A1 | 6/2005 | Kohane et al. |
| 2005/0167107 A1 | 8/2005 | Roddy et al. |
| 2005/0190648 A1 | 9/2005 | Tang et al. |
| 2005/0205248 A1 | 9/2005 | Barolak et al. |
| 2005/0234649 A1 | 10/2005 | Calvert et al. |
| 2006/0162930 A1 * | 7/2006 | Gronsveld ............. C04B 28/02 166/293 |
| 2006/0198243 A1 | 9/2006 | Tang et al. |
| 2006/0269752 A1 | 11/2006 | Holland et al. |
| 2007/0206439 A1 | 9/2007 | Barolak et al. |
| 2007/0219758 A1 | 9/2007 | Bloomfield |
| 2008/0073082 A1 | 3/2008 | Thiercelin |
| 2008/0131709 A1 | 6/2008 | Hanson et al. |
| 2010/0126718 A1 | 5/2010 | Lilley |
| 2011/0048701 A1 | 3/2011 | Williams et al. |
| 2011/0240302 A1 | 10/2011 | Coludrovich |
| 2012/0018154 A1 | 1/2012 | James |
| 2012/0080184 A1 | 4/2012 | Jahangir et al. |
| 2012/0175118 A1 | 7/2012 | Khatri et al. |
| 2012/0188236 A1 | 7/2012 | Legendre et al. |
| 2012/0247774 A1 * | 10/2012 | Li .................... C09K 8/685 166/305.1 |
| 2013/0065755 A1 | 3/2013 | Taylor et al. |
| 2013/0161006 A1 | 6/2013 | Robisson et al. |
| 2014/0052376 A1 | 2/2014 | Guo et al. |
| 2014/0102704 A1 | 4/2014 | Patil et al. |
| 2014/0121136 A1 * | 5/2014 | Mirakyan ............... C09K 8/52 507/201 |
| 2014/0144634 A1 | 5/2014 | Nguyen et al. |
| 2015/0107493 A1 | 4/2015 | Rice |
| 2016/0032706 A1 | 2/2016 | Bornaz et al. |
| 2017/0121587 A1 | 5/2017 | Allouche et al. |
| 2017/0349805 A1 | 12/2017 | Musso et al. |

FOREIGN PATENT DOCUMENTS

| | | |
|---|---|---|
| DE | 19801610 A1 | 7/1999 |
| EP | 0073335 A1 | 3/1983 |
| EP | 0098778 A2 | 1/1984 |
| EP | 1275983 A2 | 1/2003 |
| EP | 1464959 B1 | 7/2006 |
| EP | 2113546 A1 | 4/2008 |
| EP | 2169027 A1 | 3/2010 |
| EP | 2246408 A2 | 11/2010 |
| EP | 2615151 A1 | 7/2013 |
| EP | 2676944 A1 | 12/2013 |
| EP | 1698912 B1 | 7/2016 |
| JP | S5841756 A | 3/1983 |
| JP | 2009263164 A | 11/2009 |
| RU | 2452758 C1 | 6/2012 |
| WO | 1988004729 A1 | 6/1988 |
| WO | 9322537 A1 | 11/1993 |
| WO | 2002087959 A2 | 11/2002 |
| WO | 03048526 A2 | 6/2003 |
| WO | 03106809 A1 | 12/2003 |
| WO | 2004088302 A1 | 10/2004 |
| WO | 2005030174 A1 | 4/2005 |
| WO | 2005061846 A1 | 7/2005 |
| WO | 2005089458 A2 | 9/2005 |
| WO | 2007041420 A2 | 4/2007 |
| WO | 2008034461 A1 | 3/2008 |
| WO | 2008047107 A1 | 4/2008 |
| WO | 2010140032 A2 | 12/2010 |
| WO | 2010141037 A2 | 12/2010 |
| WO | 2011126667 A1 | 10/2011 |
| WO | 2012027334 A1 | 3/2012 |
| WO | 2012177262 A1 | 12/2012 |
| WO | 2013023949 A2 | 2/2013 |
| WO | 2015047301 A1 | 4/2015 |
| WO | 2015195596 A1 | 12/2015 |

(56) References Cited

FOREIGN PATENT DOCUMENTS

| WO | 2015195596 A9 | 5/2016 |
|---|---|---|
| WO | 2017137788 A1 | 8/2017 |
| WO | 2017137789 A1 | 8/2017 |

OTHER PUBLICATIONS

Examination Report issued in European Patent Appl. No. 16305415.8 dated Jun. 22, 2018; 6 pages.
International Search Report and Written Opinion issued in International Patent Appl. No. PCT/EP2017/000492 dated Jul. 13, 2017; 20 pages.
Musso et al., "Expanding Cement Compositions", U.S. Appl. No. 14/307,430 (unpublished), filed Jun. 17, 2014; 20 pages.
American Concrete Institute 223R-10 Guide for the Use of Shrinkage-Compensating Concrete, 2010, 20 pages.
Extended European Search Report issued in European Patent Appl. No. 16305449.7 dated Nov. 10, 2016; 7 pages.
Extended European Search Report issued in European Patent Appl. No. 16305416.6 dated Oct. 12, 2016; 7 pages.
Examination Report issued in European Patent Appl. No. 16305416.6 dated Jun. 22, 2018; 5 pages.
Jin et al., "Preparation, characterization and application of octadecyl modified magnesium oxide microspheres", Analytica Chemica Acta, vol. 693, pp. 54-61, 2011.
Chemical Abstracts, Chemical Abstracts Service (CAS), US, Mar. 25, 1991, XP000193363, ISSN: 0009-2258, abstract, p. 353.
Brufatto et al., "From Mud to Cement—Building Gas Wells": Oilfield Review Autumn 2003, p. 62-p. 76.
Zhen—New Cementing Technologies Successfully Solved the problems in shallow Gas, Low Temperature and Easy Leakage Formations, SPE131810—CPS/SPE International Oil & Gas Conference and Exhibition in China held in Beijing, China, Jun. 8-10, 2010 (17 pages).
Moroni et al., Achieving Long-tem isolation for thin gas zones in the Adriatic sea region, SPE92193—SPE Western Regional Meeting held in Irvine, CA, U.S.A., Mar. 30-Apr. 1, 2005 (11 pages).
Van Kuijk et al., "A Novel Ultrasonic Cased-Hole Imager for Enhanced Cement Evaluation", IPTC 10546, Proceedings of International Petroleum Technology Conference, Jan. 1, 2005, 14 pages.
Boukhelifa et al., Evaluation of Cement Systems for Oil and Gas Wells Zonal Isolation in a Full-Scale Annular Geometry, SPE 87195—IADC/SPE Drilling Conference held in Dallas, Texas, U.S.A., Mar. 2-4, 2004 (15 pages).
Belrute et al.,—Attenuation of Casing Cemented with Conventional and Expanding Cements Across Heavy-Oil and Sandstone Formations, SPE18027—SPE Drilling Engineering, Sep. 1992 (7 pages).
Wicks et al., "Modeling and Field Trials of the Effective Tractoring Force of Axial Vibration Tools", SPE 170327, SPE Deepwater Drilling and Completions Conference, Sep. 10-11, 2014, 11 pages.
Office Action issued in related U.S. Appl. No. 16/077,498 dated Apr. 5, 2019, 27 pages.

* cited by examiner

SLURRY COMPRISING AN ENCAPSULATED EXPANSION AGENT FOR WELL CEMENTING

The present application claims priority to European Procedure (EP) Application Serial No. 16305415.8, filed on Apr. 8, 2016, incorporate herein by reference in its entirety.

BACKGROUND

The present application claims priority to (1) European Procedure (EP) Application Serial No. 16305415.8, filed on Apr. 8, 2016, (2) EP Application Serial No. 16305416.6 filed on Apr. 8, 2016, and (3) EP Application Serial No. 16305449.7 filed on Apr. 18, 2016, all incorporated herein by reference in their entirety.

The statements in this section merely provide background information related to the present disclosure and may not constitute prior art.

The present disclosure broadly relates to cement and cementing operations.

Hydraulic cement is any substance provided (at least at one time in the manufacturing process) in a powdered or granular form, that when mixed with a suitable amount of water, can form a paste that can be poured or molded to set as a solid mass. In the oil and gas industry, good bonding between set cement and casing, and also between set cement and the formation, are essential for effective zonal isolation. Poor bonding limits production and reduces the effectiveness of stimulation treatments. Communication between zones can be caused by inadequate mud removal, poor cement/formation bonding, expansion and contraction of the casing resulting from internal pressure variations or thermal stresses, and cement contamination by drilling or formation fluids. Under such circumstances a small gap or microannulus may form at the cement/casing interface, the cement/formation interface, or both.

Representative examples of shrinkage-compensating cement are found in U.S. Pat. No. 7,988,782, US20150107493 and U.S. Pat. No. 4,419,136.

Expansive cement has also been used in the oil and gas industry to cement wells. Representative examples of this technology are found in U.S. Pat. Nos. 2,465,278, 3,884,710, 4,002,483, 4,797,159, 5,942,031, 6,966,376, and U.S. Ser. No. 14/307,430. Use of expanding agents to cement wells is problematic since the expanding agents known in the art begin hydrating and thus begin to expand as soon as they contact water. Accordingly, if the expanding agent is going to expand the cement after the cement slurry is positioned within the well, the expanding agent cannot be added to the cement slurry mix water. Also, when the expansion agent is added to the slurry, the viscosity and/or yield stress of the slurry may increase before the slurry can be placed and set. This is especially problematic when the cement slurry is exposed to increased temperature conditions such as are frequently encountered downhole in a well. Incorporation of expanding agents thus leads to difficulties in pumping and placement of the slurry, along with complicating job design.

Moreover, since the cement slurry is readily flowable, any hydration of the expanding agent that occurs before the cement begins to set does not contribute to producing a compressive force within the annulus of the well due to the expansion of the set cement.

Various efforts to delay expansion have been suggested. Coating of metal oxide particles with non-hydratable or previously hydrated minerals such as metal carbonates, hydroxides and hydrates was suggested in U.S. Pat. Nos. 4,332,619, 5,741,357, EP2169027A1, EP2246408, U.S. Pat. No. 7,494,544, US20020037306, and U.S. Pat. No. 7,670,627. These formulations are also difficult to prepare and have had only limited success. Other general examples of encapsulated materials for delivery include US20130065755, US20050123596, US20040234597, US20040109894, WO2005030174, U.S. Pat. Nos. 7,722,954, and 6,209,646.

Portland cement manufacturers have employed shrinkage-compensating cements that include an offsetting "expansive cement", which is a cement that when mixed with water forms a paste. This paste then sets to form a hardened cement. After setting, the cement increases in volume to significantly greater degree than Portland cement paste to form an expanded set cement as defined in the American Concrete Institute 223R-10 Guide for the Use of Shrinkage-Compensating Concrete (2010). Representative examples of shrinkage-compensating cement are found in U.S. Pat. No. 7,988,782, US20150107493 and U.S. Pat. No. 4,419,136.

The cement industry, in general, is in need of ways to improve the preparation, handling and design of hydraulic cements with hydratable expanding agents that address these problems and shortcomings; and the oil and gas industry is in need of ways to better and more controllably delay expansion of the expanding agents, and to improve the bonding between the set cement and the casing within the well annulus.

SUMMARY

Some embodiments of the present disclosure are directed to expanding cement formulations, along with methods and systems for placing the cement. In some embodiments, the formulations include a delayed action encapsulated expanding agent which expands as the cement sets to form a radially pre-stressed cement sheath within an annulus between the well casing and a surrounding barrier, such that the expanded set cement is transversely compressed between, and bonded to, the well casing and the borehole wall or another tubular body concentric with the well casing.

One aspect of the present disclosure includes methods to prepare a well cementing slurry including coating particles comprising an expanding agent with a component selected from the group consisting of a phenolic resin, a silica, a calcination product of a polysiloxane oil, and a combination thereof; and combining the coated particles with mix water and hydraulic cement to form a cement slurry for cementing a well.

Another aspect of the present disclosure is a well cementing slurry including water, a hydraulic cement, and a plurality of particles comprising an expanding agent coated with a component selected from the group consisting of a phenolic resin, a silica, a calcination product of a polysiloxane oil, and a combination thereof.

Yet another aspect of the present disclosure is a method to cement a subterranean well including (i) preparing the well cementing slurry according to the previously mentioned methods to prepare a well cementing slurry and well cementing slurry; (ii) placing the slurry in an annular region of the well around a tubular member; (iii) hardening the slurry to form an at least partially set cement; and (iv) hydrating the expanding agent to form an expanded set cement within the annular region.

DETAILED DESCRIPTION

Figure 1A:
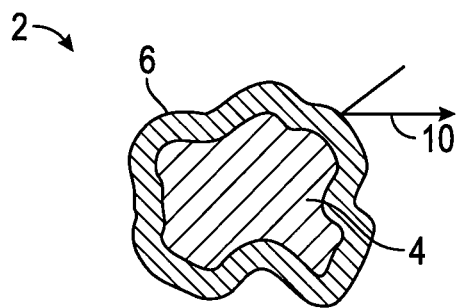
FIG. 1A is a schematic diagram showing an essentially impermeable capsule according to embodiments of the disclosure.

The present disclosure will be described in terms of treatment of vertical wells, but is equally applicable to wells of any orientation. As used herein, "transverse" is intended to refer to a direction transverse to the axis of the well, e.g., the horizontal direction in a vertical well and vice versa. The disclosure will be described for hydrocarbon-production wells, but it is to be understood that the disclosed methods can be used for wells for the production or injection of other fluids, such as water or carbon dioxide, for example. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that applicant appreciates and understands that any and all data points within the range are to be considered to have been specified, and that the applicant has possession of the entire range and all points within the range.

As used in the specification and claims, "near" is inclusive of "at." The term "and/or" refers to both the inclusive "and" case and the exclusive "or" case, whereas the term "and or" refers to the inclusive "and" case only and such terms are used herein for brevity. For example, a component comprising "A and/or B" may comprise A alone, B alone, or both A and B; and a component comprising "A and or B" may comprise A alone, or both A and B.

In this disclosure, a "tubular body" or "tubular member" may be any string of tubulars that may be run into the wellbore and at least partially cemented in place. Examples include casing, liner, solid expandable tubular, production tubing, drill pipe, and the like. For purposes of clarity and convenience, the following discussion is in reference to well casing as a non-limiting example of a tubular body or member.

As used herein, a "set cement" refers to a cement which has set (e.g., been allowed to cure, allowed to harden, and the like) for a time greater than or equal to the "initial time of setting", also referred to herein simply as the "initial set time" as determined according to ASTM C191-04a, "Time of Setting of a Hydraulic Cement by Vicat Needle", or an equivalent thereof. This same method is also used to determine the "final set time" of the cement slurry.

As used herein, a "bond" between a body within the wellbore and the set cement refers to acoustically coupled contact between the body and the cement and/or the formation of a fluid-tight seal. For purposes herein, a well casing or other tubular body is acoustically coupled to the expanded set cement when the cement is shown to exist behind the well casing by acoustic logging techniques known in the art. Accordingly, for purposes herein, a bond does not exist between a tubular body or member and a cement sheath when a micro annulus or airspace is present between the two as shown by acoustic logging techniques. Likewise, as used herein, "compression" in the annular region refers to compression in the transverse direction against or between the first tubular member and the borehole wall or second tubular member due to expansion of the cement.

As used herein, the terms "shell" and "coating" are used synonymously to mean the outermost one or group of layers covering or over a surface of a body, but need not directly contact the surface. As used herein, a water permeable shell refers to a shell which comprises one or more components or features which allow for water infiltration into the core through all or part of the shell upon exposure, or following a period of delay after the exposure, of the shell to water, such as when the water present in a cement slurry.

As used herein, the water permeable shell refers to an outer coating which is sufficiently resistant to water infiltration, or which delays water infiltration to delay hydration of the encapsulated material in the particular slurry, system or method and/or conditions thereof.

As used herein, "essentially impermeable" means that the shell or coating, e.g., a pH activated shell or coating, is sufficiently resistant to water infiltration such that there is substantially no hydration of the encapsulated material in the particular slurry, system or method and/or conditions thereof, e.g., prior to increasing the pH above the activation pH, e.g., less than 5% relative expansion of an expanding agent in a 48-hour period of exposure at the actual conditions, or less than 1 wt % liquid infiltration into the body in a 48-hour period of exposure to the particular slurry or fluid at atmospheric pressure and 25° C., based on the total weight of the coating and body. In all embodiments herein, the shell may be essentially impermeable to water at a pH of 10 or less, or a pH of 9.5 or less, or a pH of 9 or less, or a pH of 8.5 or less, or at a pH otherwise below the activation pH.

For purposes herein, a shell may be or become water permeable under certain conditions, may include components or sections which are at least partially soluble in aqueous solutions, and/or which may undergo a chemical reaction upon contact with aqueous solutions, and/or which may decompose upon contact with an aqueous solution, and/or which may undergo a phase transition upon contact with an aqueous solution. The water permeable shell thereby allows water infiltration or otherwise allows hydration of the expanding agent or other core material in (or from) the capsule. In embodiments, a water permeable shell includes a shell which at least partially surrounds a core, but which has or forms pores, voids, and/or discontinuities within the shell which allow water to pass through the shell and contact the core when present in an aqueous solution. As used herein, a water permeable shell may also include a shell which allows diffusion of water through the shell, e.g., via partial dissolution of the shell material and/or osmosis.

In some embodiments, water infiltration through the shell may occur by osmosis, increasing osmotic pressure within the encapsulating material, which may induce rupture of the shell to expose the remainder of the expanding agent to water present. The result may be an increase in the rate of hydration of the expanding agent. In some embodiments, the expanding agent is, or comprises an osmotic attractant which functions to draw water into the capsule, which in embodiments, bursts or otherwise ruptures the outer shell to expose the expanding agent to the water present. The rupture of the shell results in an increase in hydration and expansion of the expanding agent. In some embodiments, the water permeable shell may further comprise an osmotic attractant.

An expanding agent is any material, which, when added to hydraulic cement, tends to increase the volume of the set cement, e.g., a hydratable material that combines with water to form a hydrate having a larger volume relative to the hydratable material. In some embodiments, the expanding agent comprises calcium oxide, magnesium oxide, calcium sulfate hemihydrate, or a combination thereof. In some embodiments, the expanding agent comprises or consists of calcium oxide. In some embodiments, the expanding agent comprises or consists of magnesium oxide. In some embodiments, the expanding agent comprises or consists of a mixture of calcium oxide and magnesium oxide, e.g., in a weight ratio of CaO:MgO of from 1:100 to 100:1.

The terms capsule, encapsulated expanding agent, expanding agent capsule, and the like are used interchangeably to refer to a capsule comprising a core as a single entity disposed within a water-permeable shell.

Figure 4:
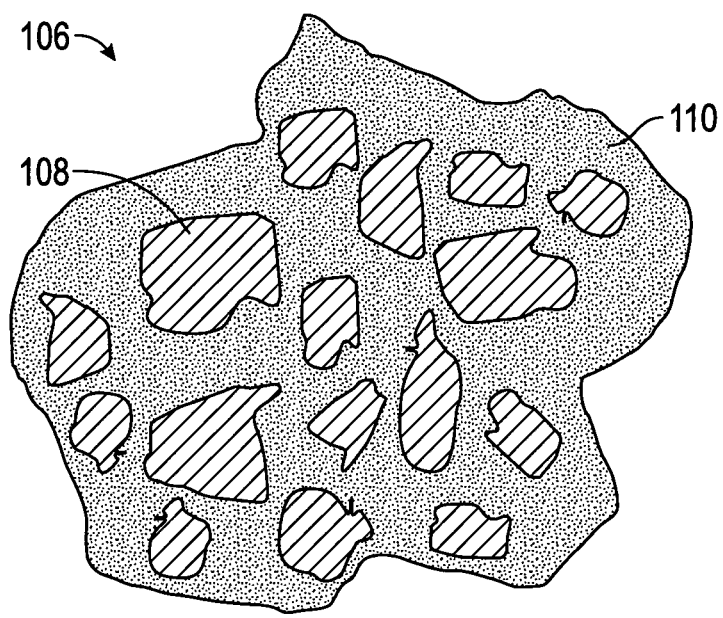
FIG. 4 shows a capsule having a matrix island arrangement according to embodiments of the disclosure.

As used herein, capsules may comprise a single-core arrangement or configuration, i.e., (cf. FIG. 1A, cf. FIG. 11) a single core at least partially contained within a shell, which may optionally be or become water permeable, and/or may comprise a "matrix-island" arrangement or configuration in which the expanding agent is distributed at least partially within each particle or capsules as small islands within a matrix of the encapsulating or shell material (cf. FIG. 4), e.g., the expanding agent is dispersed as a discontinuous phase within the continuous shell material. In some embodiments, the core is homogenous. In other embodiments, the core may comprise various heterogeneous components. In some embodiments, the shell comprises a single layer. In other embodiments, the shell comprises a plurality of layers, each of which may be the same or different. In some embodiments, as shown in FIG. 4, the capsules 106 comprise or consist essentially of capsules having a "matrix-island" configuration in which portions of the expanding agent 108, such as those encapsulated by a silica material, (only a representative amount are numbered for clarity) are dispersed as a discontinuous phase within the continuous shell 110. In some embodiments, the capsules may comprise a "matrix-island" configuration disposed around a single-core shell such that the capsules comprise both a single-core and a matrix-island configuration.

As used herein for ease of reference, when a polymer is referred to as comprising a monomer, the monomer is present in the polymer in the polymerized form. As used herein, unless specifically stated otherwise, the term "polymer" refers to a molecule comprising 2 or more "mer" units, and includes oligomers such as dimers, trimers, tetramers, etc., as well as materials having a higher degree of polymerization, i.e., 20 or more. For example, the "mer" of polydimethyl siloxane would be dimethyl siloxane. As another example, a condensation polymer made from phenol and formaldehyde may be referred to herein in a conventional manner as a phenol-formaldehyde polymer or resin, even though the as-polymerized monomers may comprise phenylene groups connected in a network via methylene and/or dimethylene ether bridging groups. As used herein, a "polymer" may include both homopolymers and/or copolymers. The term "resin" refers to a solid or highly viscous substance such as a polymer, and resins may or may not comprise prepolymers with reactive groups. A "crosslink" refers to a chemical bond between different chains in a polymer or other complex molecule.

For purposes herein, an aliphatic moiety is defined as a linear and/or a branched saturated hydrocarbon chain. An alicyclic moiety is defined as a cyclic hydrocarbon chain, which may further include one or more heteroatoms. An olefinic moiety is defined as a linear, branched, and/or cyclic hydrocarbon chain comprising at least one carbon-carbon double or triple bond, which may further include a heteroatom. An aromatic moiety refers to a moiety comprising one or more aromatic systems, including one or more heteroaromatic systems.

A "polysiloxane oil" is any liquid polymerized siloxane with organic side chains. For purposes herein, a polysiloxane refers to a polymeric organosilicon compound, commonly referred to as a silicone-based organic polymer, or simply as a silicone having the following structure:

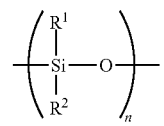

wherein $R^1$ and $R^2$ are the same or different and comprise a hydrocarbyl having from 1 to 20 carbon atoms, and where n is sufficient to form an oil having a viscosity from 100 to 100,000 cSt at 25° C. Polysiloxanes may be linear or ring compounds.

In some embodiments herein, the well cementing slurry exhibits less than 50% relative expansion, based on a total percent expansion of the expanded set cement determined according to API-10B-5, prior to an initial set time for the cement slurry, determined according to ASTM C191-04a, and greater than 50% relative expansion after the initial set time for the cement slurry. For purposes herein, the percent expansion produced by setting or hardening of the cement slurry into the expanded set cement is determined according to API-10B-5 or an equivalent thereof. In this method, a ring shaped mold sealed on the top and bottom is filled to form a circular ring of cement. The mold has a stationary inner ring surrounded by an expandable outer ring which increases in circumference as the cement slurry inside the mold sets and expands. The test may be conducted at various temperatures and pressures. The percent expansion is determined by first measuring the distance M (mm) between two points on the outer ring at the time of filling the mold with the cement $T_0$ (e.g., measure $M_0$ (mm) @ $T_0$), and then again measuring the distance between these same two points after the cement has set to form the expanded set cement. This measurement is determined at the final time $T_f$, as specified in the method (e.g., $M_f$(mm) @ $T_f$). The total percent expansion is then determined by multiplying the difference between the final distance and the initial distance by a constant associated with the particular mold, according to the following formula:

Percent expansion=$(M_f-M_0)$*mold constant.

For purposes herein, this percent expansion obtained at the final time $T_f$ is referred to as the total percent expansion of the cement. This total percent expansion of the cement serves as the basis for all relative percent expansion determinations, as discussed herein. For purposes herein, the relative expansion of the cement slurry at a particular time ($T_1$), referred to as the percent relative expansion is equal to the percent expansion of the slurry (or setting cement) measured at a time $T_1$ divided by the total percent expansion achieved by the expanded set cement at $T_f$ determined according to API-10B-5. As an example, if a percent expansion at time $T_1$ is determined according to API-10B-5 to be 0.1%, and the total percent expansion at time $T_f$ is determined according to the same method under the same conditions to be 1%, the percent relative expansion of the cement slurry at time $T_1$ would be:

0.1%/1%*100%=10% relative expansion at $T_1$

Since the cement slurry being placed within the annulus of the wellbore is readily flowable, any expansion which occurs before the cement begins to set may increase the volume of the cement slurry, and is not thought to contribute to expansion within the annulus which produces a cement sheath transversely compressed therein. Accordingly, in embodiments, at least a percentage of the hydration of the expanding agent is delayed until after the initial set time of the cement, thereby delaying the expansion of the cement to a time after the slurry becomes more resistant to flow. This allows placement of the cement slurry within the annulus and at least partial setting of the cement prior to expansion of the cement.

In embodiments, the delay in expansion of the cement slurry is determined relative to the initial set time, the final set time, or a combination thereof for the cement slurry. In embodiments, to evaluate the suitability of a proposed cement formulation for a particular cementing job, the initial and final set times, as well as the relative expansion, are determined at an appropriate pressure and temperature, e.g., a downhole pressure and temperature expected to be encountered during the cementing job, or if there is a range of temperatures, the highest temperature expected for the cement or, if this exceeds the limits of the testing apparatus, then the highest temperature limit of the testing apparatus. For purposes of the claims and embodiments herein, the set times may be determined at standard conditions of 45° C. and 1 atmosphere of pressure, unless otherwise stated. The initial set time and the final set time are determined according to ASTM C191-04a, or an equivalent thereof. The relative expansion properties of the cement slurry at various times, or within various time intervals, are determined relative to the total amount of expansion (the total percent expansion) obtained by the cement slurry, utilizing the percent expansion determined according to API-10B-5.

For purposes of the claims and embodiments herein, the percent relative expansion may be determined at standard conditions of 30° C. to 45° C. and 1 atmosphere of pressure, unless otherwise stated. In embodiments, to evaluate the suitability of a proposed cement formulation for a particular cementing job, the percent relative expansion is determined at an appropriate pressure and temperature, e.g., a downhole pressure and temperature expected to be encountered during the cementing job, or if there is a range of temperatures, the highest temperature expected for the cement that is within the limits of the testing apparatus, e.g., if the testing apparatus has a maximum testing temperature of 100° C., the testing temperature is the lesser of the maximum temperature of the annular region or 100° C. In embodiments, when it is determined that the proposed cement slurry formulation is suitable for the job, the cement slurry for the well cementing job is prepared in accordance with the formulation meeting the expansion characteristics.

In embodiments the composition and/or arrangement of the outer shell is selected to delay hydration of the expanding agent until a time after the outer shell is combined with the hydraulic cement. As is known to one of skill in the art, the addition of a hydraulic cement to an aqueous medium results in a hydration of the cement and, an expanding agent if present. The shell according to embodiments disclosed herein initially inhibits the infiltration of water into the shell thereby delaying the hydration of the expanding agent.

In embodiments the shell is selected to delay hydration of the expanding agent after being combined in the cement slurry for a time such that prior to an initial set time for the cement slurry, determined according to ASTM C191-04a, or an equivalent thereof, the percent relative expansion of the cement slurry, if any, is less than 50%, based on the total percent expansion of the expanded set cement determined according to API-10B-5.

In embodiments, the shell is selected to delay hydration of the expanding agent after being combined in the cement slurry for a time such that prior to an initial set time for the cement slurry, determined according to ASTM C191-04a, or an equivalent thereof, the percent relative expansion of the cement slurry that occurs, if any, is less than 50% (or less than 40%, or less than 30%, or less than 20%, or less than 10%), based on the total percent expansion of the expanded set cement determined according to API-10B-5; and after the initial set time for the cement slurry, the percent relative expansion of the cement slurry that occurs is greater than 50% (or greater than 60%, or greater than 70%, or greater than 80%, or greater than 90%), based on the total percent expansion of the expanded set cement determined according to API-10B-5.

Utilizing this test, the ability of the shell to delay hydration of the expanding agent after being combined in the cement slurry may be determined to meet requirements of a particular cementing operation. In embodiments, other method to determine the delay of hydration of the expanding agent may be used including differential scanning calorimetry, a temperature-controlled confinement cell used to measure the effects of expanding agents, and the like.

In an aspect, embodiments relate to a method to cement a subterranean well having a borehole disposed through a formation, comprising preparing a cement slurry comprising water, hydraulic cement, and a plurality of capsules comprising an expanding agent at least partially surrounded by a shell comprising an expanding agent with a phenolic resin, a silica, a calcination product of a polysiloxane oil, or combinations thereof; placing the slurry in an annular region of the well between a first tubular body and a borehole wall, or between the first tubular body and a second tubular body; hardening the slurry to form an at least partially set cement; and hydrating and expanding the expanding agent to form an expanded set cement within the annular region.

In embodiments, the expanding agent may comprise calcium oxide, magnesium oxide, calcium sulfate hemihydrate, or a combination thereof, e.g., calcium oxide alone, magnesium oxide alone, or both calcium oxide and magnesium oxide. In embodiments, the expanding agent is present in the cement slurry at a concentration between 0.1 weight percent and 35 weight percent, based on the total weight of the hydraulic cement present.

In embodiments, the expanding agent particles have an average particle size between 0.1 μm and 500 μm, or between 1 μm and 100 μm, and the coated particles have an average particle size between 1 μm and 1000 μm, or between 10 μm and 500 μm.

In embodiments, the calcination product is produced by calcination of polydimethylsiloxane, polyphenylmethylsiloxane, polydiphenylsiloxane, or combinations thereof, having a kinematic viscosity from 100 to 100,000 cSt, e.g., from 1,000 to 10,000 cSt. In embodiments, the calcination product of the polysiloxane oil is formed by mixing particles comprising the expanding agent with one or more polysiloxane oils to form oil coated particles, followed by calcining the oil coated particles at a temperature between 200° C. and 1000° C., e.g., from 250° C. to 650° C., for a period of time between 1 minute and 24 hours, e.g., from 0.5 hours to 10 hours. In embodiments, the par Particles comprising the expanding agent are calcined at a temperature from 100° C. to 1500° C. for a period of time between 1 minute and 24 hours to dehydrate or otherwise remove water from the particles prior to said mixing the particles comprising the expanding agent with the polysiloxane oil to form the oil coated particles.

In embodiments, the capsules comprise from 0.1 wt % to 35 wt % of the calcination product of the polysiloxane oil, based on the total weight of the capsules. In embodiments, the capsules comprise a plurality of layers, one or more of which may optionally be water permeable, wherein at least one of the layers comprises the calcination product of one or more polysiloxane oils. In embodiments in which more than one layer comprises the calcination product of one or more polysiloxane oils, the calcination product present in each layer may be the same or different.

In some aspect, embodiments herein relate to methods to prepare a well cementing slurry, comprising an expanding agent with a component selected from the group consisting of a phenolic resin, a silica, a calcination product of a polysiloxane oil, and a combination thereof, and combining the coated particles with mix water and cement to form a cement slurry for cementing a well. As used herein, "mix water" refers to the water that is added to the cement to make a cement slurry, and may contain various miscible or immiscible liquid and dispersed or dissolved solid additives such as fluid loss agents, antifoam agents, dispersants, antisettling agents, set retarders, or the like. In embodiments, the silica coated particles of the expanding agent may be combined with the hydraulic cement and/or mix water in any order to make the cement slurry. In embodiments, the coated expanding agent particles may be blended with the dry hydraulic cement, either offsite at a remote location or on-site as part of the cementing procedure, and then the blend combined with mix water to make the cement slurry. In embodiments, the method comprises dry blending the silica coated particles and the hydraulic cement, and mixing the dry blend with the mix water. The dry blend can be stored indefinitely under low-humidity conditions, and prepared off-site and transported to the job location.

An expanding agent is any material, which, when added to hydraulic cement, tends to increase the volume of the set cement, e.g., a hydratable material that combines with water to form a hydrate having a larger volume relative to the hydratable material. In embodiments, the expanding agent comprises a metal oxide which hydrates to form the corresponding metal hydroxide. Examples include calcium oxide, magnesium oxide, calcium sulfate hemihydrate, or combinations thereof. In embodiments, the expanding agent comprises calcium oxide, magnesium oxide, or a combination thereof. In embodiments, the expanding agent particles have an average particle size between 0.1 μm and 500 μm, or between 1 μm and 100 μm, prior to coating, and the coated particles have an average particle size between 1 μm and 1500 μm, 1 μm and 1000 μm, between 10 μm and 900 μm, between 200 μm and 800 μm, between 250 μm and 700 μm or between 250 urn and 500 μm.

In some embodiments, coating the particles with the silica comprises contacting the particles with a solution of the silicate, and condensing the silicate in the coating. In some embodiments, particles of the expanding agent are encapsulated with the silica coating by condensation of sodium silicate, potassium silicate, or a combination thereof. In some embodiments, the silicate solution is aqueous or non-aqueous. The silicate solution in some embodiments is sprayed on the particles or otherwise paced in contact with the particles. Any spraying methodology or equipment may be used, e.g., a fluidized bed reactor, a spouted bed reactor, or the like. Multiple passes can be used in embodiments to increase the thickness of the coating.

In embodiments, an acid treatment may be used to neutralize any remaining reactive materials from the silicate solution, e.g., by contacting the particles with an organic or inorganic acid or acidic solution thereof, such as, for example, hydrochloric acid, sulfuric acid, nitric acid, phosphoric acid, acetic acid, methane sulfonic acid, and the like, and combinations thereof.

In embodiments, the capsules are heat treated, which may strengthen or reinforce the silica coating, and thereby inhibit water infiltration and/or breakage, and increase the period of delayed expansion. Any method can be used to heat the capsules, e.g., a rotary kiln or calciner, conveyor belt furnace, or the like. The capsules may be heated, e.g., at a controlled ramp to avoid thermal shock, to temperatures from 200° C. to 1000° C., e.g., 250° C. to 650° C., or 350° C. to 450° C.

The amount of silica in the capsules in embodiments ranges from 1 to 60 weight percent, e.g., from 10 to 35 weight percent, based on the total weight of the capsules.

In some embodiments, the method comprises mixing the silica coated particles and the mix water, and blending the mixture with the hydraulic cement. In some embodiments, depending on the impermeability of the silica coating thus the ability to prevent hydration of the coated expanding material, the particle-water mixture can be prepared in advance of the blending with the hydraulic cement, e.g., prepared off-site and transported to the job location, or prepared on-site and stored for an extended period, e.g., more than an hour or more than a day or more than a week before preparing the cement slurry. In embodiments, a method to produce a cement slurry comprises combining mix water and silica-coated particles of an expanding agent wherein the coating becomes water permeable at a pH greater than an activating pH to form a first mixture having a pH less than the activating pH, e.g., a pH about 5-10 or 6-9. The method may optionally include adding a (minor) amount of an acid or base (i.e., less than 10 wt %) to adjust the pH of the first mixture. This first mixture may be subsequently combined with the hydraulic cement to produce the cement slurry according to embodiments disclosed herein.

In embodiments, the cement slurry comprises an amount of expanding agent sufficient to form the expanded set cement transversely compressed between, and bonded to, the first tubular body and the borehole wall, or the first tubular body and the second tubular body. In embodiments, the bond between the first tubular body and the borehole wall is sufficient to isolating a zone of the formation adjacent the expanded set cement.

In embodiments, the bond between the first tubular body and the expanded set cement is maintained after fluctuating the dimensions of the first tubular body in response to a temperature change, a pressure change, a mechanical disturbance resulting from a well intervention, or a combination thereof.

In embodiments, infiltration of a portion of the water into one or more of the plurality of capsules comprises entry of the water through a discontinuity (e.g., an imperfection) in the silica shell. In embodiments, the infiltration of a portion of the water into one or more of the plurality of capsules comprises diffusion through at least a portion of the water permeable shell. In embodiments, the infiltrating of the portion of the water into one or more of the plurality of capsules hydrates the expanding agent thereby expanding the expanding agent in an amount sufficient to rupture the shell.

In embodiments, the shell is selected to allow less than 50% relative expansion, based on a total percent expansion of the expanded set cement determined according to API-10B-5, to occur prior to an initial set time for the cement slurry determined according to ASTM C191-04a, and greater than 50% relative expansion, based on the total percent expansion of the expanded set cement determined according to API-10B-5, to occur after the initial set time for the cement slurry determined according to ASTM C191-04a.

In embodiments, the calcination product of the silicone oil comprises, or consists essentially of an inorganic component, typically silicon oxide, which agglomerates upon calcination forming a continuous or semi-continuous shell disposed around the particle of expanding agent.

In embodiments, the shell may further comprise one or more inorganic oxides, one or more organic polymers, or a combination thereof.

In embodiments, the expanding agent is present in the cement slurry at a concentration between 0.1 or 1 weight percent and 35 weight percent, based on the total weight of hydraulic cement present.

In embodiments, the expanding agent capsules are present in the cement slurry at a concentration greater than or equal to about 0.1 weight percent based on the total weight of hydraulic cement and the capsules, or greater than or equal to about 0.5 weight percent, or greater than or equal to about 1 weight percent, or greater than or equal to about 5 weight percent, and less than or equal to about 30 weight percent, or less than or equal to about 25 weight percent, or less than or equal to about 20 weight percent, or less than or equal to about 10 weight percent, or less than or equal to about 5 weight percent, based on the total weight of hydraulic cement and capsules. In embodiments, the expanding agent is present in the cement slurry at a concentration between about 0.1 weight percent and 20 weight percent, or between about 0.5 weight percent and 10 weight percent, or between about 1 weight percent and 5 weight percent, based on the total weight of hydraulic cement and capsules. In embodiments, the amount of expanding agent capsules present in the slurry is suitable to produce from 0.1 percent to 5 percent total expansion of the cement slurry upon hardening into an expanded set cement as determined according to API 10B-5 or an equivalent thereof, e.g., from 0.2 to 3 percent total expansion, or from 0.5 to 2 percent total expansion.

In embodiments, the viscosity of the cement slurry prior to the initial set time and/or during placement, according to ASTM C191-04a, may be lower than 1000 cP at a shear rate of 100 s$^{-1}$. In embodiments, the hydraulic cement comprises Portland cement, calcium aluminate cement, fly ash, blast furnace slag, lime, silica, magnesium oxychloride, a geopolymer, zeolite, chemically bonded phosphate ceramic, diatomaceous earth, gilsonite, hematite, ilmenite, manganese tetraoxide, barite, glass or ceramic microspheres, or combinations thereof. In some embodiments the hydraulic cement consists essentially of Portland cement.

In embodiments, the capsules containing the expanding agent may be combined with the hydraulic cement and/or water in any order to make the cement slurry. In embodiments, the encapsulated expanding agent may be blended with the dry hydraulic cement, either offsite at a remote location or on-site as part of the cementing procedure, and then the blend combined with water, optionally more cement and/or other additives, to make the cement slurry.

In embodiments, a method to produce a cement slurry comprises combining water, a hydraulic cement, and a plurality of capsules comprising an expanding agent at least partially surrounded by a shell comprising a phenolic resin, a silica, or a calcination product of a polysiloxane oil, or combinations thereof; and mixing to form the cement slurry. In embodiments, the plurality of capsules are combined with at least a portion of the hydraulic cement prior to combining with water.

In embodiments, the cement slurry according to the instant disclosure is prepared which comprises water, hydraulic cement and capsules comprising a core of an expanding agent at least partially surrounded by (e.g., encapsulated within) a shell (see FIG. 1A). In some embodiments, the cement slurry may comprise water, hydraulic cement and an expanding agent comprising a silica coating, phenolic resin coating, a coating having a calcination product of a polysiloxane oil, which are at least partially surrounded by (e.g., encapsulated within) a shell. The slurry is then placed in an annular region between a first tubular body (e.g., the well casing) and a borehole wall or a second tubular body (see FIGS. 2 and 3). The slurry is then allowed to at least partially set, also referred to in the art as "harden", i.e., allowed to set for a time greater than or equal to the first or initial set time measured for the cement slurry when determined according to ASTM C191-04a, or an equivalent thereof. Water contacting the capsules results in the infiltration of a portion of the water present in the slurry into the capsules. As the water contacts the expanding agent, the expanding agent hydrates, causing the expanding agent to expand. In embodiments, this expansion may cause the remaining portion of the shell to rupture, thus releasing or further reducing the inhibition of the water contacting the expanding agent, or otherwise further accelerating hydration and expansion of the expanding agent.

Expansion of the expanding agent within the partially set cement forms an expanded set cement within the annular region of the wellbore. In embodiments, the amount of expansion of the cement is sufficient to form an expanded set cement radially pre-stressed within the cement sheath, i.e., the expanded set cement is transversely compressed between the first tubular body and the borehole wall, or the first tubular body and the second tubular body.

In some embodiments, the amount of expanding agent present in the cement slurry is sufficient to produce an expanded set cement in a state of compression within the annular region which facilitates maintenance of a bond with the first tubular member and the borehole wall or second tubular member.

The method may further comprise fluctuating the dimensions of the first tubular body, e.g., allowing the dimensions of the tubular body to fluctuate in response to a temperature change, a pressure change, or a turbulence resulting from a well intervention or a combination thereof. This is a common technique applied when conducting sonic logging of the well to determine the presence and quality of the cement sheath in the annulus between the well casing the next barrier. The method may also further comprise transversely compressing the set cement between the first tubular body and the borehole wall or second tubular body to maintain bonding therewith, e.g., allowing the set cement to expand and/or to maintain the state of compression, during and/or after the dimensional fluctuation of the first tubular body.

In a further aspect, embodiments relate to methods for maintaining zonal isolation in a wellbore. A cement slurry is prepared that comprises water, hydraulic cement and capsules comprising an expanding agent at least partially surrounded by a shell, which may optionally be water permeable, comprising a phenolic resin, a silica, or a calcination product of a polysiloxane oil, or combinations thereof. The slurry is then placed in an annular region between a first tubular body and a borehole wall or a second tubular body. The slurry is hardened, e.g., allowed to harden, to form an at least partially set cement. Water is infiltrated, e.g., allowed to infiltrate, into the capsules to hydrate the expanding agent in the core. The set cement is expanded to compress against and bond with the borehole wall to isolate a zone of the formation adjacent the expanded cement. The compression and bond are maintained adjacent the isolated zone after dimensions of the first tubular body are fluctuated, e.g., allowed to fluctuate in response to a temperature change, a pressure change, or a mechanical disturbance resulting from a well intervention or a combination thereof. In embodiments an acoustic logging tool is introduced into the tubular body. The tool measures acoustic impedance, amplitude, attenuation or a bond index or a combination thereof. In some embodiments, the measurements are taken azimuthally, longitudinally or both along the tubular body.

For all aspects, the expansion of the expanding agent, and thus the expansion of the cement, may be delayed for a particular period of time after initial contact of the capsules containing the expanding agent (e.g., the encapsulated expanding agent) with water. In embodiments, the capsules are "activated" upon contact with water to allow infiltration of water therein. In some embodiments, such activation may occur by subjecting the coated particles to a pH greater than 10.

In some embodiments, the composition and/or configuration of the shell may be selected to delay the time between contacting the cement composition with water (i.e., preparing a cement slurry comprising water, hydraulic cement and capsules comprising an expanding agent at least partially surrounded by a shell comprising a calcination product of a polysiloxane oil and expansion of the set cement brought about by hydration and subsequent expansion of the expanding agent (e.g., infiltration of water into the capsule and/or rupture of the shell to hydrate and expand the expanding agent).

In embodiments, the selection of the shell composition, including the silica, phenolic resin, and/or calcination product of a polysiloxane oil, may include selection of a plurality of layers, which may be the same or different in composition, thickness, or a combination thereof. In embodiments, the selection of the shell may include selecting the composition of the polysiloxane oil, the amount of polysiloxane oil used to coat the expanding agent particles, the calcination temperature and/or time, the calcination conditions including in an inert atmosphere or in the presence of oxygen, and the like. These selections may thus increase or decrease the thickness of the encapsulating outer layer or layers of the shell (i.e., the number and composition of each shell layer, the thickness of each shell layer, or a combination thereof. In embodiments, other inorganic oxides may be incorporated into the polymeric shell which, upon contact with the aqueous solution of the cement formulation, at least partially dissolve to form weaknesses or discontinuities within the shell thus allowing for water infiltration into the shell with subsequent activation (hydration of the expanding agent).

In embodiments, the particles comprising the expanding agent may be heat-treated before the coating, to remove any residual water or hydrate. This can be done in any oven or furnace, including rotary calciner and conveyor belt furnace, at temperature ranging from 100° C. to 1500° C. over a time from about 1 minute to 24 hours.

In embodiments, the polysiloxane oils, i.e., silicone oils have the following structure:

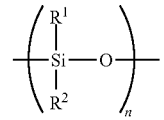

wherein $R^1$ and $R^2$ are the same or different and comprise hydrocarbyl of from 1 to 20 carbon atoms, and where n is sufficient to form an oil having a viscosity from 100 to 100,000 cSt at 25° C.

In embodiments, $R^1$ and $R^2$ are independently selected from the group consisting of methyl, ethyl, propyl, phenyl, and combinations thereof. In embodiments, the particles are coated with one or more polysiloxane oils, which can be of different types, different molecular weights, i.e., different viscosities, or both. Examples of suitable silicone oils include polydimethylsiloxane (PDMS), polyphenylmethylsiloxane (PPMS), polydiphenylsiloxane (PDPS) and any co-polymers thereof. Mixtures comprising silicone oils, and/or mixtures of different silicone oils may also be used. In embodiments, the kinematic viscosity of each of the silicone oils can range from 100 to 100,000 cSt at 25° C. In embodiments, the viscosity of each polysiloxane oil is equal to or greater than 1000 cSt and less than or equal to 10,000 cSt.

In embodiments, the particles comprising the expanding agent, or which consist essentially of the expanding agent are mixed with the silicone oil in any type of mixer, for example high-energy mixer or V-blender. The silicone oil aggregates and coats the particles forming the oil coated particles. The resulting material is then calcined at high temperature. Any method may be used including using a rotary kiln or calciner, a conveyor belt furnace, or the like, at temperature ramps which reach the treatment temperature between 200° C. and 1000° C., e.g., from 250° C. to 650° C., or from 350° C. to 450° C. In embodiments, the particles are calcined for 1 minute to about 24 hours, or from 0.5 hours to about 10 hours. Multiple layers may be applied to increase the thickness of the coating.

In embodiments, the residual coating, i.e., the calcination product of the polysiloxane oil or oils, is present in the capsules at from 0.1 weight percent to 35 weight percent, or from about 1 weight percent to about 15 weight percent, or from about 1 weight percent to about 5 weight percent, based on the total weight of the capsules. In embodiments, the average particle size of the expanding agent particles is between 0.1 µm and 500 µm, or between 1 µm and 100 µm, and the coated particles have an average particle size between 1 µm and 1000 µm, or between 10 µm and 500 µm.

In embodiments, the shell is selected to delay water infiltration into the capsule, e.g., causing a longer time to dissolve, thereby delaying hydration and subsequent expansion of the expanding agent until the cement slurry is properly placed within the annulus of the well bore and has begun to set i.e., allowed to set for a time greater than or equal to the first or initial set time measured for the cement slurry when determined according to ASTM C191-04a, or an equivalent thereof.

In the figures, like numerals are used to designate like parts. As shown in FIG. 1A, the capsule 2 comprises a core 4, comprising an expanding agent, which is at least partially surrounded by a shell or coating 6. Initially, the water is excluded by the impermeable shell 6, as shown by arrow 10.

Figure 1B:
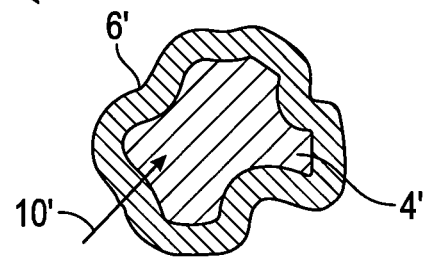
FIG. 1B is a schematic diagram showing the capsule of FIG. 1A after becoming permeable according to embodiments of the disclosure.

As shown in FIG. 1B, after activation, e.g., by exposure to water present in the cement slurry, the capsule 2' comprises a core 4', comprising the expanding agent, which is at least partially surrounded by a shell 6', which has become water permeable, e.g., by at least partial dissolution, hydrolysis, decomposition, or other means of degradation of one or more components of the shell 6'. When the material of the shell 6' becomes permeable, water infiltrates as shown by arrow 10' through the activated shell 6', even though in some embodiments the shell 6' may physically remain generally intact. When the water reaches the core 4', the expanding material begins hydrating and expansion is initiated.

Decomposition or other effects of the high pH on the coating (e.g., coating made of a phenolic resin, a silica, or a calcination product of a polysiloxane oil) can result in the infiltration of a portion of the water present in the slurry into the expanding agent particles. As the water contacts the expanding agent, the expanding agent hydrates, causing the expanding agent to expand. Accordingly, the expanding agent is activated at the pH of the cement slurry. In embodiments, this expansion may cause the remaining portion of the coating to rupture, thus releasing or further reducing the inhibition of the water contacting the expanding agent, or otherwise further accelerating hydration and expansion of the expanding agent.

Figure 1C:
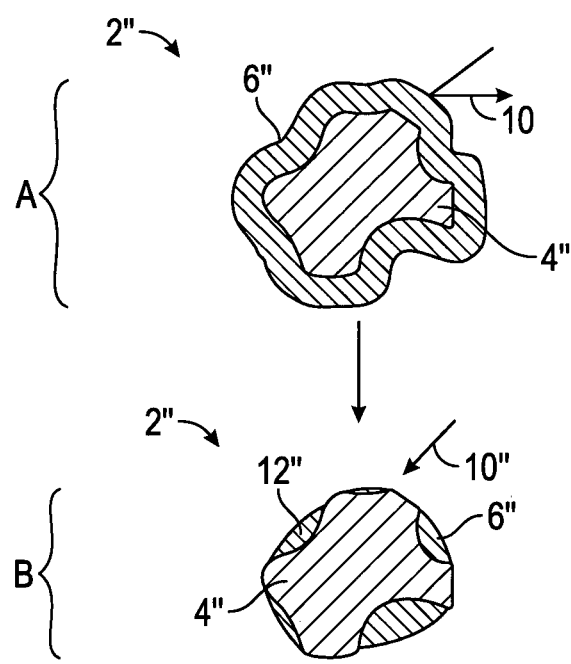
FIG. 1C is a schematic diagram showing the capsule of FIG. 1A and or FIG. 1B after removal of shell material according to further embodiments of the disclosure.

As shown in FIG. 1C, in an initial "A" stage, the capsule 2" comprises a core 4", comprising an expanding agent, which is at least partially surrounded by a shell 6", in a manner similar to FIGS. 1A and 1B. Initially, the water is excluded by the impermeable shell 6", as shown by arrow 10. After activation in a later stage "B", e.g., by exposure to water in the cement slurry, the capsule 2" comprises a core 4", comprising the expanding agent, which is directly exposed to water permeation 10" through surface(s) 12", which may comprise holes or exposed areas between any remaining shell portions 6" following removal, e.g., by at least partial dissolution, hydrolysis, decomposition, or other means of degradation of one or more components of the shell 6". When the water reaches the core 4", the expanding material begins hydrating and expansion is initiated. In the "B" stage, the core 4" is expanded and the expansion may further tear and/or rupture the shell 6", and/or otherwise enlarge the openings exposing the surfaces 12", to accelerate further water infiltration 10", hydration, and expansion of the core 4".

Figure 2:
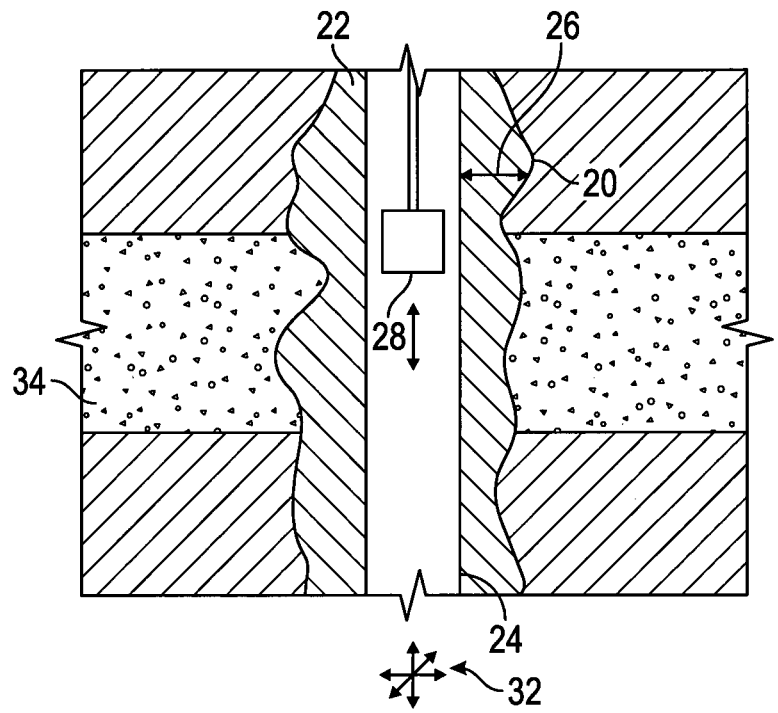
FIG. 2 shows a diagram of a well cemented according to embodiments of the disclosure.
Figure 3:
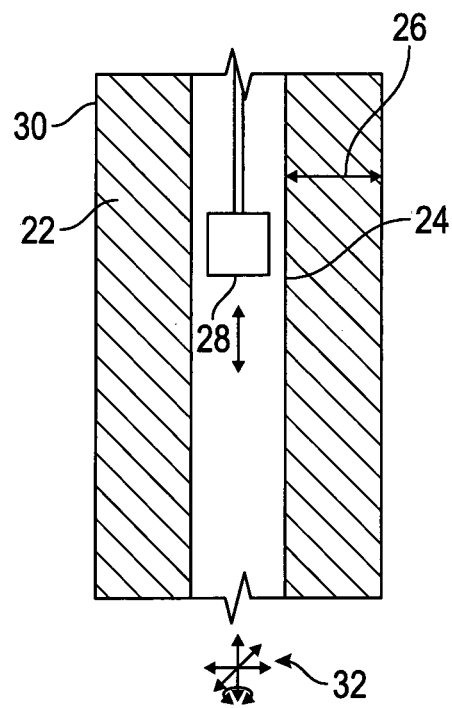
FIG. 3 shows a diagram of an annulus between two tubular members cemented according to embodiments of the disclosure.

With reference to some embodiments, borehole 20 and tubular member 30 are shown in FIGS. 2 and 3, respectively, wherein like numerals are used to designate like parts. The cement slurry comprising the capsules according to any embodiments disclosed herein is placed in the annulus 22 around the casing or other tubular member 24, set (initial and or final) in place, and with hydration of the expanding agent, expanded as indicated at 26 to induce a state of compression and facilitate bonding. The annulus 22 is shown between the tubular member 24 and the borehole wall 20 (FIG. 2) or the tubular member 30 (FIG. 3). The ex 28 is then introduced to take measurements as described in some embodiments herein, for example, to map impedance and determine the presence of cement in the annulus 22 behind the tubular member 24, or the absence thereof suggesting formation of a microannulus (not shown) between the tubular member 24 and the set cement in the annulus 22.

The tubular member 24 in FIGS. 2 and 3 (and/or tubular member 30 in FIG. 3) may be dimensionally changed in length, diameter, rotational alignment, etc., e.g., with respect to the wellbore 20 (FIG. 2) or the tubular member 30 (FIG. 3), some examples of which are indicated at 32. Expansion 26 of the cement set in the annulus 22 can occur before the dimensional change 32, and according to some embodiments, the state of compression of the cement is maintained in the annulus 22 during and/or after the dimensional change 32, e.g., by further expansion or increased compression to accommodate the changing dimension(s). Expansion 26 of the cement set in the annulus 22 can instead and/or also occur during and/or after the dimensional change 32, and according to some embodiments of the disclosure, the state of compression of the cement can be induced in the annulus 22 during and/or after the dimensional change 32.

With reference to FIG. 2, in some embodiments a zone 34 is isolated by placement, setting (initial and or final), and expansion 26 of the cement in the annulus 22. The compression and bonding can be maintained during dimensional change 32, e.g., so that the zone 34 remains in isolation and does not fluidly communicate via the annulus 22 with other zones in the formation.

As shown in FIGS. 2 and 3, in embodiments the cement slurry comprises an amount of expanding agent sufficient to form the expanded set cement transversely compressed between (due to expansion 26) and bonded to, the first tubular member (tubular body) 24 and the borehole wall, or the first tubular member (tubular body) 24 and the second tubular member (tubular body) 30.

As shown in FIG. 2, in embodiments, the bonds between the first tubular body 24 and the expanded set cement, and between the borehole wall and the expanded set cement are each sufficient to be acoustically coupled and/or to isolate a zone 34 of the formation adjacent the expanded set cement, e.g., from another zone. In some embodiments, the compression 26 and bonding can be maintained during dimensional change 32, e.g., so that the zone 34 remains in isolation and does not fluidly communicate via the annulus 22 with other zones.

In some embodiments, as shown in FIG. 1A, the capsules 2 comprise or consist essentially of a single-core configuration, in which the expanding agent is arranged as a single core 4 at least partially surrounded by the initially impermeable shell 6, which is activated by contact with water resulting in permeation and entry of water into the core, as illustrated in FIGS. 1B and 1C. In some embodiments, the capsules may comprise a mixture of one or more types of the single-core capsules (FIGS. 1A, 1B, 1C) and/or one or more layer configurations. In some embodiments, the coated particles may comprise a mixture of one or more types of the single-core capsules (FIGS. 1A, 1B, 1C) and/or one or more types of the "matrix-island" configuration (FIG. 4), and/or the capsules may be a "hybrid" of large-core expanding material particles as well as smaller dispersed expanding material particles within the same shell (not shown).

In some embodiments, core-shell type particles can release or expose the encapsulated expanding agent, e.g., all at once, if the shell is ruptured, which can occur mechanically and/or by chemical degradation. As used herein, "rupture" refers to any loss of integrity of the shell whether by tearing, bursting, and so forth. Matrix-island type cores can release the islands of expanding agent upon chemical degradation and/or solubility of the matrix.

In some embodiments, although the rates of water infiltration, release of encapsulated, expanding agent, and expansion of the cement may be predicted, the infiltration, release, and expansion profiles can also be observed in laboratory experiments before the particles are used. Such experiments involve exposing a sample quantity of the particles to conditions which match those found in the borehole location and monitoring water infiltration and/or release of expanding agent over time, and/or formulating the cement slurry with the encapsulated particles and monitoring the expansion of the set cement upon exposure to the matching borehole conditions.

In embodiments, the initial set time and final set time for a cement slurry according to embodiments disclosed herein may be determined according to ASTM C191-04a. This may be done at standard temperatures, or at temperatures expected downhole. The expansion properties of the cement slurry upon setting may then be evaluated according to API-10B-5. The amount of expansion of the cement slurry prior to the initial set time may be determined, along with the amount of the expansion after the initial set time but before the final set time. Then the total amount of expansion of the expanded set cement may be determined.

In embodiments, the shell is selected such that the amount of expansion which occurs prior to the initial set time (according to ASTM C191-04a) is less than 1%, or less than 5%, or less than 10%, or less than 20%, or less than 30%, or less than 40%, or less than 50% of the total amount of expansion obtained by the set cement determined according to API-10B-5. In embodiments, the amount of expansion (according to API-10B-5) obtained after the initial set time but before the final set time of the cement slurry (according to ASTM C191-04a) is greater than about 50%, or greater than about 60%, or greater than about 70%, or greater than about 80%, or greater than about 90%, or greater than about 95% of the total amount of expansion obtained by the expanded set cement.

Utilizing this test, the attributes of the shell may be determined to meet requirements of a particular cementing operation.

In embodiments, a system for cementing a subterranean well in an annulus between a casing disposed within a borehole and a formation comprises a cement slurry according to one or more embodiments disclosed herein comprising water, hydraulic cement and a capsules comprising an expanding agent at least partially surrounded by a shell, which may optionally be or become water permeable, comprising a phenolic resin, a silica, a calcination product of a polysiloxane oil, or combinations thereof; and a pumping system to place a stage of the slurry in the annulus.

In some embodiments herein, an encapsulated expanding agent having utility in a cement slurry, e.g., a well cementing slurry, comprises particles of an expanding agent coated with a phenolic resin.

For purposes herein, a phenolic resin refers to phenol-formaldehyde polymers prepared by step condensation polymerization of an aromatic alcohol, referred to herein as a phenolic monomer, such as phenol, and an aldehyde, referred to herein as a hardener or a formaldehyde monomer or component, such as formaldehyde, and or other hardener, e.g., a multifunctional amine such as hexamethylenetetramine. Hardeners used to effect crosslinking, e.g., hexamethylenetetramine for curing a novolac or two-step resin, are also referred to herein as curing agents or crosslinking agents.

For purposes herein, a phenolic monomer refers to phenol and substituted phenols, i.e., phenolic compounds in which one or more of the hydrogen atoms of the phenol structure is substituted with hydroxyl, halogen (e.g., F, Cl, Br, I), or hydrocarbyl of up to 10 carbon atoms, which may be aliphatic (linear or branched or alicyclic, e.g., methyl, ethyl, tert-butyl, n-pentyl, cyclohexyl), olefinic, aromatic (e.g., phenyl, benzyl), etc. or any combination of these substituents. Specific representative examples include, for example, phenol, cresol isomers, resorcinol, xylenol isomers, cardanol, and the like, or a combination thereof. In some embodiments, the phenolic monomer comprises phenol, consists essentially of phenol (e.g., >95 mol % phenol), or consists of phenol. The following discussion refers to phenol by way of non-limiting example for the purposes of clarity and convenience.

For purposes herein, an aldehyde refers to an organic compound having the formula R—CHO group. In some embodiments, the R group in the aldehyde may be a hydrocarbyl having from 1 (formaldehyde) or 2 carbon atoms up to 10 carbon atoms, and may be aliphatic (linear or branched or cyclic, e.g., propionic aldehyde, butylaldehyde, acetaldehyde, furfural), olefinic, aromatic (e.g., benzaldehyde), etc. For purposes herein, a hydrocarbyl is defined as a hydrocarbon radical; an aliphatic moiety is defined as a linear and/or a branched saturated hydrocarbon chain; an alicyclic moiety is defined as a cyclic hydrocarbon chain, which may further include one or more heteroatoms; an olefinic moiety is defined as a linear, branched, and/or cyclic hydrocarbon chain comprising at least one carbon-carbon double or triple bond, which may further include a heteroatom; and an aromatic moiety refers to a moiety comprising one or more aromatic systems, including one or more heteroaromatic systems.

In some embodiments herein, the aldehyde comprises formaldehyde, consists essentially of formaldehyde (e.g., >95 mol % formaldehyde), or consists of formaldehyde. Formaldehyde generally exists in several forms, e.g., monomeric formaldehyde, hydrated (methylene glycol), cyclic trimer (trioxane), polymeric formaldehyde (paraformaldehyde), and so on. The formaldehyde may be used in a solution, e.g., aqueous formaldehyde (e.g., 10-50 wt % formaldehyde), and may include methanol or another stabilizer (e.g., 0.1-10 wt %). The following discussion refers to formaldehyde by way of non-limiting example for the purposes of clarity and convenience.

In some embodiments, the phenolic resin comprises a novolac resin. In some embodiments, the phenolic resin comprises a resole resin. In embodiments, the phenolic resin, e.g., the novolac resin, is crosslinked. In embodiments, the expanding agent particles within the phenolic resin coating is partially hydrated at an outer surface of the respective particles adjacent the coating.

In some embodiments herein, the phenolic resins may be either of two broad classes: resole (single stage) resins and novolac (two stage) resins. Resole resins are typically produced with a phenol, a molar excess of formaldehyde and an alkaline catalyst, and can be characterized by both methylene and ether bridges. The reaction may be controlled to optionally create a non-cross-linked resin that can, if desired, be cured by heat without additional catalysts to form a three dimensional cross-linked insoluble, infusible polymer.

In contrast, novolac resins are typically produced with formaldehyde, a molar excess of phenol, and an acid catalyst. The reaction produces a thermoplastic polymer characterized by methylene bridges, and can be melted but will not cross-link upon the application of heat alone. The resulting novolac thermoplastic resin can be optionally cross-linked by the addition of a novolac curing agent, such as more formaldehyde, hexamethylenetetramine, resole resin, melamine resin, or the like.

In some embodiments according to the present disclosure, particles of the expanding agent are coated with the phenolic resin, e.g., prior to combination with water and hydraulic cement to form a cement slurry, e.g., for cementing a well.

In some embodiments herein, a method to prepare a well cementing slurry comprises coating particles of an expanding agent with a phenolic resin; and combining the coated particles with water and hydraulic cement to form a cement slurry for cementing a well. In some embodiments, the expanding agent particles have an average particle size between 0.1 μm and 500 μm, or between 1 μm and 100 μm, and the phenolic-resin coated particles have an average particle size between 1 μm and 1000 μm, or between 10 μm and 500 μm. In some embodiments, the resin-coated particles comprise the phenolic resin in an amount of from 0.1 to 35 weight percent, or from 1 to 15 weight percent, or from 1 to 5 weight percent, based on the total weight of the particles and the coating.

In some embodiments, the coating of the particles with the phenolic resin comprises contacting the expanding agent particles with a phenolic monomer and an aldehyde; and polymerizing the phenolic monomer and the aldehyde to form a layer of the phenolic resin coating. In embodiments, the contacting comprises spraying the phenolic monomer and aldehyde onto the particles, e.g., spray drying, fluidized bed, pan-coating, and so on. In embodiments, a suitable weight ratio of phenolic monomer to expanding agent particles is from 1:100 to 1:1, e.g., from 1:30 to 1:5. The phenolic monomer and aldehyde in various embodiments are mixed and applied together, or separately, e.g., concurrently or stepwise. The application of the phenolic monomer and/or aldehyde to the expanding agent particles in various embodiments is continuous, batch, and/or semi-batch.

In some embodiments, the phenolic monomer comprises a substituted phenol, the aldehyde has the formula R—CHO wherein R is a hydrocarbyl having from 2 to 10 carbon atoms, or a combination thereof. In some embodiments, the phenolic monomer comprises phenol. In some embodiments, the aldehyde comprises formaldehyde, methylene glycol, trioxane, paraformaldehyde, or a combination thereof. In some embodiments, the phenolic monomer comprises phenol, and the aldehyde comprises formaldehyde, methylene glycol, trioxane, paraformaldehyde, or a combination thereof.

In some embodiments, a molar ratio of the aldehyde to the phenolic monomer is less than 1, e.g., to make a novolac. In some embodiments, a molar ratio of the aldehyde to the phenolic monomer is greater than 1, e.g., to make a resole.

In some embodiments, the aldehyde, the phenolic monomer, or a combination thereof, comprises an aqueous solution, e.g., 10-50 wt % formaldehyde, and may include methanol or another stabilizer, e.g., 0.1-10 wt % methanol. In embodiments, the water from the aqueous solution may hydrate an outermost layer or surface of the expanding agent particles. In embodiments, this hydration may be negligible and/or may be reduced in extent upon further heat treatment, either during or after the coating of the particles. In some embodiments, the hydration at the surface of the expanding agent particles may affect the time of delay of the activation of the expanding agent in the cement slurry.

In some embodiments, the method may comprise crosslinking the phenolic resin in the coating. The crosslinking may occur concurrently with the coating operation as the phenolic resin is formed or applied to the particles, or may be effected in a discrete crosslinking step. In the case of a novolac, for example, the initial polymerization may produce phenolic oligomers, which can be crosslinked by the addition of a hardener, which may be, for example, formaldehyde, methylene glycol, trioxane, paraformaldehyde, hexamethylenetetramine, resole resin, melamine resin, or the like.

In some embodiments, the polymerization may occur in the presence of a catalyst, such as an acidic compound, e.g., for novolac resin, or basic compound, e.g., for resole. The polymerization and/or crosslinking, if present, may occur at a suitable temperature, e.g., between 50° C. and 250° C., or between 80° C. and 150° C., and can be effected with standard equipment such as a rotary calciner, conveyor belt furnace, or the like. In some embodiments, heating alone, or in the presence of a harder or curing agent, can crosslink or otherwise harden the phenolic resin and/or remove water from the expanding agent or the phenolic resin. If desired, the contacting of the particles with the phenolic monomer and/or aldehyde and or polymerization thereof, may be repeated one or more times, e.g., to increase the thickness of the phenolic coating or to improve impermeability or strength. Each subsequent contacting may in some embodiments be preceded by intermediate polymerization and/or crosslinking, or followed by subsequent polymerization and/or crosslinking.

In some embodiments, the method comprises mixing the phenolic resin coated particles and the mix water, and blending the mixture with the hydraulic cement. In some embodiments, depending on the impermeability of the phenolic resin coating thus the ability to prevent hydration of the coated expanding material, the particle-water mixture can be prepared in advance of the blending with the hydraulic cement, e.g., prepared off-site and transported to the job location, or prepared on-site and stored for an extended period, e.g., more than an hour or more than a day or more than a week before preparing the cement slurry. In embodiments, a method to produce a cement slurry comprises combining water and phenolic resin-coated particles of an expanding agent wherein the coating becomes water permeable at a pH greater than an activating pH to form a first mixture having a pH less than the activating pH, e.g., a pH about 5-10 or 6-9, or in some embodiments, from around neutral pH (e.g., 6.5 to 8.5) up to a pH in excess of 10 or 11 or more. In some embodiments, this increase in pH may result in the phenolic resin coating becoming (substantially more) water permeable and eventually allows water to infiltrate into the expanding agent to hydrate and thereby expand the expanding agent. The method may optionally include adding a (minor) amount of an acid or base (i.e., less than 10 wt %) to adjust the pH. This first mixture may be subsequently combined with the hydraulic cement to produce the cement slurry according to embodiments disclosed herein.

In embodiments, the phenolic resin coating is essentially impermeable to water at a pH below the target or activating pH, and allows at least 10 times greater water infiltration, or 20 times, or 30 times, or 40 times, or 50 times, or 60 times, or 70 times, or 80 times, or 90 times, or essentially fails to inhibit water infiltration above the activating pH.

In embodiments, the phenolic resin coating becomes water permeable at a pH greater than about 10, or a pH greater than about 10.5, or a pH greater than about 11, or a pH greater than about 11.5, or a pH equal to or greater than about 12. In embodiments, the phenolic resin coating is essentially impermeable to water at the pH of the mix water used to produce the cement, and becomes water permeable at the pH of the cement formulation after a period of delay, i.e., the phenolic resin coating eventually becomes water permeable when combined with the hydraulic cement and water.

In embodiments, the shell may comprise polymers which degrade at a pH of less than 10, but do so at a rate which allows preparation and or storage of the resin coated particles in an aqueous mixture prior to combining with the hydraulic cement. In embodiments, less than 1 wt % of the coating decomposes over a 24 hour period, or over a 1 week period (168 hours), or over a 2 week period (336 hours) at 25° C., when the coated particles are slurried in water, and the resulting mixture has a pH from about 5 to about 10 or from about 6 to about 9. Accordingly, embodiments disclosed herein may be prepared ahead of time, and then combined with the hydraulic cement just prior to placement in the wellbore.

In embodiments, the ability to activate the resin coated particles via pH further provides for a more robust expanding agent, which may be premixed or shipped and stored without hydration of the expanding agent until the capsules are combined with the cement in cement slurry. Accordingly, more of the expanding agent is available down hole even after improper storage or transport in wet conditions that sometimes occur in wellsite environments.

In some embodiments, the composition and/or configuration of the pH activated phenolic resin may be selected to delay the time between contacting the cement composition with water (i.e., preparing a cement slurry comprising water, hydraulic cement and capsules comprising resin coated particles of an expanding agent at least partially surrounded by a coating which becomes water permeable at the pH of the cement slurry, or when otherwise exposed to a pH greater than an activating pH, e.g., above about 8, or above 9 or above 10 or above 11) and expansion of the set cement brought about by hydration and subsequent expansion of the expanding agent (e.g., infiltration of water into the capsule and/or rupture of the shell to hydrate and expand the expanding agent).

In embodiments, the decomposition rate of the outer layer or layers of the pH activated coating may be selected by selecting a coating composition having kinetics suitable to decompose upon contact with the water at a pH of greater than 8, or greater than 9, or greater than 10 under down hole conditions, over a suitable period of time; and/or selecting a phenolic coating composition which chemically reacts e.g., via hydrolysis with the water at the pH of the cement slurry (e.g., greater than 8, or 9, or 10, or 11) to weaken the strength of the shell and/or the solubility of the shell in a controlled manner over a suitable period of time; and/or the thickness of the shell may be selected to prevent water at the pH of the

EMBODIMENTS LISTING

Accordingly, the present disclosure provides the following embodiments, among others:

C1. Encapsulated expanding agent useful in a well cementing slurry, comprising one or more particles of an expanding agent coated with a phenolic resin, a silica, a calcination product of a polysiloxane oil, and a combination thereof.

C2. The encapsulated expanding agent of Embodiment C1 wherein the expanding agent particles have an average particle size between 0.1 μm and 500 μm.

C3. The encapsulated expanding agent of Embodiment C1 or Embodiment C2 the coated particles have an average particle size between 1 μm and 1000 μm.

C4. The encapsulated expanding agent of Embodiment C1 or Embodiment C3 wherein the expanding agent particles have an average particle size between 1 μm and 100 μm.

C5. The encapsulated expanding agent of Embodiment C2 or Embodiment C4 wherein the coated particles have an average particle size between 10 μm and 500 μm.

C6. The encapsulated expanding agent according to any one of Embodiments C1 to C5 wherein the phenolic resin comprises a polymer prepared from a phenolic monomer and an aldehyde.

C7. The encapsulated expanding agent according to Embodiment C6 wherein the phenolic monomer comprises phenol.

C8. The encapsulated expanding agent according to Embodiment C6 or Embodiment C7 wherein the phenolic monomer comprises a substituted phenol.

C9. The encapsulated expanding agent according to any one of Embodiments C6 to C8 wherein the aldehyde comprises formaldehyde, methylene glycol, trioxane, paraformaldehyde, or a combination thereof.

C10. The encapsulated expanding agent according to Embodiment C7 or C8 wherein the aldehyde is according to the formula R—CHO wherein R is a hydrocarbyl having from 2 to 10 carbon atoms.

C11. The encapsulated expanding agent according to any one of Embodiments C1 to C10 wherein the phenolic resin comprises a novolac.

C12. The encapsulated expanding agent according to Embodiment C11 wherein the resin is crosslinked.

C13. The encapsulated expanding agent according to any one of Embodiments C1 to C10 wherein the phenolic resin comprises a resole.

C14. The encapsulated expanding agent according to Embodiment C13 wherein the resin is crosslinked.

C15. The encapsulated expanding agent according to any one of Embodiments C1 to C14 wherein the resin-coated particles comprise from 0.1 to 35 weight percent of the phenolic resin, based on the total weight of the particles and the coating.

C16. The encapsulated expanding agent according to any one of Embodiments C1 to C14 wherein the resin-coated particles comprise from 1 to 15 weight percent of the phenolic resin, based on the total weight of the particles and the coating.

C17. The encapsulated expanding agent according to any one of Embodiments C1 to C14 wherein the resin-coated particles comprise from 1 to 5 weight percent of the phenolic resin, based on the total weight of the particles and the coating.

C18. The encapsulated expanding agent according to any one of Embodiments C1 to C17 wherein the expanding agent is partially hydrated at an outer surface of the respective particles adjacent the coating.

C19. The encapsulated expanding agent according to any one of Embodiments C1 to C18 wherein ones of the expanding agent particles comprise respective cores in the coated particles and the phenolic resin coating comprises a shell.

C20. The encapsulated expanding agent according to any one of Embodiments C1 to C18 wherein a plurality of the expanding agent particles are dispersed in a matrix of the phenolic resin coating.

C21. The encapsulated expanding agent according to any one of Embodiments C1 to C20 wherein the expanding agent comprises calcium oxide, magnesium oxide, calcium sulfate hemihydrate, or a combination thereof.

C22. The encapsulated expanding agent according to any one of Embodiments C1 to C20 wherein the expanding agent comprises calcium oxide.

C23. The encapsulated expanding agent according to any one of Embodiments C1 to C20 wherein the expanding agent comprises, magnesium oxide.

C24. The encapsulated expanding agent according to any one of Embodiments C1 to C20 wherein the expanding agent comprises a combination of calcium oxide and magnesium oxide.

C25. A dry blend of the encapsulated expanding agent according to any one of Embodiments C1 to C24 with hydraulic cement for preparing a well cementing slurry.

C26. A slurry of the encapsulated expanding agent according to any one of Embodiments C1 to C24 with mix water for preparing a well cementing slurry.

C27. A well cementing slurry comprising the encapsulated expanding agent according to any one of Embodiments C1 to C24, cement and water.

C28. The slurry according to Embodiment C27 wherein the cement comprises hydraulic cement.

C29. The dry blend or slurry according to any one of Embodiments C25 to C28 wherein the dry blend or slurry comprises from 0.1 to 20 weight percent of the phenolic resin-coated particles, based on the total weight of the cement and the phenolic resin-coated particles.

C30. The dry blend or slurry according to any one of Embodiments C25 to C28 wherein the dry blend or slurry comprises from 0.5 to 10 weight percent of the phenolic resin-coated particles, based on the total weight of the cement and the phenolic resin-coated particles.

C31. The dry blend or slurry according to any one of Embodiments C25 to C28 wherein the dry blend or slurry comprises from 1 to 5 weight percent of the phenolic resin-coated particles, based on the total weight of the cement and the phenolic resin-coated particles.

C32. The well cementing slurry according to any one of Embodiments C27 to C31, wherein the slurry exhibits less than 50% relative expansion, based on a total percent expansion of the expanded set cement determined according to API-10B-5, prior to an initial set time for the cement slurry, determined according to ASTM C191-04a at a pressure of 1 atm and a temperature of 30° C., and greater than 50% relative expansion after the initial set time for the cement slurry.

E1. A method to cement a subterranean well having a borehole disposed through a formation, comprising:
  (i) preparing a cement slurry comprising water, hydraulic cement, and a plurality of capsules comprising an expanding agent at least partially surrounded by a shell comprising a phenolic resin, a silica, a calcination product of a polysiloxane oil, or combinations thereof;
  (ii) placing the slurry in an annular region of the well between a first tubular body and a borehole wall, or between the first tubular body and a second tubular body;
  (iii) hardening the slurry to form an at least partially set cement; and
  (iv) expanding the expanding agent to form an expanded set cement within the annular region.

E2. The method according to embodiment E1, wherein the shell is at least partially water permeable.

E3. The method according to embodiment E1 or E2, wherein the expanding agent comprises calcium oxide, magnesium oxide, calcium sulfate hemihydrate, or a combination thereof.

E4. The method according to any one of embodiments E1 to E3, wherein the expanding agent is present in the cement slurry at a concentration between 0.1 weight percent and 35 weight percent, based on the total weight of the hydraulic cement present.

E5. The method according to any one of embodiment E1 to E4, wherein an average particle size of the expanding agent particles is between 0.1 µm and 500 µm, or between 1 µm and 100 µm.

E6. The method according to any one of embodiment E1 to E5, wherein an average particle size of the capsules (coated particles) is between 1 µm and 1000 µm, or between 10 µm and 500 µm.

E7. The method according to any one of embodiment E1 to E6, wherein the calcination product is produced by calcination of polydimethylsiloxane, polyphenylmethylsiloxane, polydiphenylsiloxane, or combinations thereof, having a kinematic viscosity from 100 to 100,000 cSt.

E8. The method according to embodiment E7, wherein the calcination product is produced by calcination of polydimethylsiloxane, polyphenylmethylsiloxane, polydiphenylsiloxane, or combinations thereof, having a kinematic viscosity from 1,000 to 10,000 cSt.

E9. The method according to any one of embodiment E1 to E8, wherein the calcination product of the polysiloxane oil is formed by mixing particles comprising the expanding agent with one or more polysiloxane oils to form oil coated particles, followed by calcining the oil coated particles at a temperature between 200° C. and 1000° C. for a period of time between 1 minute and 24 hours.

E10. The method according to embodiment E9 wherein the oil coated particles are calcined at a temperature between 250° C. and 650° C.

E11. The method according to embodiment E9 or E10, wherein the oil coated particles are calcined for 0.5 hours to 10 hours.

E12. The method according to any one of embodiments E9 to E11, wherein the oil coated particles are calcined in the presence of oxygen.

E13. The method according to any one of embodiments E9 to E11, wherein the oil coated particles are calcined in the absence of oxygen.

E14. The method according to any one of embodiments E9 to E13, wherein the particles comprising the expanding agent are calcined at a temperature from 100° C. to 1500° C. for a period of time between 1 minute and 24 hours prior to said mixing the particles comprising the expanding agent with the polysiloxane oil to form the oil coated particles.

E15. The method according to any one of embodiment E1 to E14, wherein the capsules comprise from 0.1 wt % to 35 wt % of the calcination product of the polysiloxane oil, based on the total weight of the capsules.

E16. The method according to any one of embodiment E1 to E15, wherein the capsules comprise a plurality of layers, at least one layer comprising the calcination product of the polysiloxane oil.

E17. The method according to any one of embodiment E1 to E16, wherein the cement slurry comprises an amount of expanding agent sufficient to form the expanded set cement transversely compressed between, and bonded to, the first tubular body and the borehole wall, or the first tubular body and the second tubular body.

E18. The method according to embodiment E17, further comprising isolating a zone of the formation adjacent the expanded set cement.

E19. The method according to embodiment E17 or E18, wherein the bond between the first tubular body and the expanded set cement is maintained after fluctuating the dimensions of the first tubular body in response to a temperature change, a pressure change, a mechanical disturbance resulting from a well intervention, or a combination thereof.

E20. The method according to any one of embodiment E1 to E19, wherein the shell is selected to allow less than 50% relative expansion, based on a total percent expansion of the expanded set cement determined according to API-10B-5, to occur prior to an initial set time for the cement slurry determined according to ASTM C191-04a, and greater than 50% relative expansion to occur after the initial set time for the cement slurry, wherein the initial set time and relative expansion are determined at 30° C. and 1 atm.

E21. The method according to any one of Embodiments E1 to E20, further comprising:
a. preparing a proposed cement slurry formulation comprising the water, cement, and encapsulated expanding agent;
b. determining that the proposed cement slurry formulation exhibits expansion characteristics of less than 50% relative expansion, based on a total percent expansion of the expanded set cement determined according to API-10B-5, prior to an initial set time for the proposed slurry formulation, determined according to ASTM C191-04aC, and greater than 50% relative expansion after the initial set time for the proposed slurry formulation, wherein the initial set time and relative expansion are determined at a maximum downhole pressure and temperature in the annular region up to 100° C., or at 100° C. if the maximum temperature of the annular region is greater than 100° C., during the placing (ii), hardening (iii), and hydrating (iv); and
c. preparing the cement slurry in (i) for the placing in (ii), hardening in (iii), and expanding in (iv), in accordance with the proposed cement slurry formulation having the characteristics as determined in (b).

E22. The method according to any one of Embodiments E1 to E21, wherein the silica comprises a condensation product of a silicate.

E23. The method according to any one of Embodiments E1 to E21, wherein the silica comprises sodium silicate.

E24. The method according to any one of Embodiments E1 to E21, wherein the silica comprises potassium silicate.

E25. The method according to any one of Embodiments E1 to E21, wherein the silica-coated particles comprise from 1 to 60 weight percent of the silica, based on the total weight of the particles and the coating.

E26. The method according to any one of Embodiments E1 to E21, wherein the silica-coated particles comprise from 10 to 35 weight percent of the silica, based on the total weight of the particles and the coating.

E27. The method according to any one of Embodiments E1 to E21, wherein the expanding agent is partially hydrated at an outer surface of the respective particles adjacent the coating.

E28. The method according to any one of Embodiments E1 to E21, wherein one of the expanding agent particles comprise respective cores in the coated particles and the silica coating comprises a shell.

E29. The method according to any one of Embodiments E1 to E21, wherein a plurality of the expanding agent particles is dispersed in a matrix of the silica coating.

E30. The method according to any one of Embodiments E1 to E21, wherein the expanding agent comprises calcium oxide, magnesium oxide, calcium sulfate hemihydrate, or a combination thereof.

E31. The method according to any one of Embodiments E1 to E21, wherein the expanding agent comprises calcium oxide.

E32. The method according to any one of Embodiments E1 to E21, wherein the expanding agent comprises magnesium oxide.

E33. The method according to any one of Embodiments E1 to E21, wherein the slurry exhibits less than 50% relative expansion, based on a total percent expansion of the expanded set cement determined according to API-10B-5 at 45° C. and 1 atm, prior to an initial set time for the cement slurry, determined according to ASTM C191-04aC at 45° C. and 1 atm, and greater than 50% relative expansion after the initial set time for the cement slurry.

M1. A method to produce a cement slurry, comprising: mixing water, a hydraulic cement, and a plurality of capsules comprising an expanding agent at least partially surrounded by a shell comprising a phenolic resin, a silica, a calcination product of a polysiloxane oil, or combinations thereof, to form the cement slurry.

M2. The method according to embodiment M1, wherein the capsules are combined with at least a portion of the hydraulic cement prior to combining with water.

M3. The method according to embodiment M1 or M2, wherein the capsules are combined with at least a portion of the water prior to combining with the hydraulic cement.

M4. The method according to any one of embodiments M1 to M3, wherein the shell is at least partially water permeable.

M5. The method according to any one of embodiments M1 to M4, wherein the expanding agent comprises calcium oxide, magnesium oxide, calcium sulfate hemihydrate, or a combination thereof.

M6. The method according to any one of embodiments M1 to M5, wherein the expanding agent is present in the cement slurry at a concentration between 0.1 weight percent and 35 weight percent, based on the total weight of the hydraulic cement present.

M7. The method according to any one of embodiment M1 to M6, wherein an average particle size of the particles of the expanding agent is between 0.1 m and 500 µm.

M8. The method according to any one of embodiment M1 to M7, wherein an average particle size of the capsules is between 1 µm and 1000 µm.

M9. The method according to any one of embodiment M1 to M8, wherein the calcination product is produced by calcination of polydimethylsiloxane, polyphenylmethylsiloxane, polydiphenylsiloxane, or combinations thereof, having a kinematic viscosity from 100 to 100,000 cSt.

M10. The method according to embodiment M9, wherein the calcination product is produced by calcination of polydimethylsiloxane, polyphenylmethylsiloxane, polydiphenylsiloxane, or combinations thereof, having a kinematic viscosity from 1,000 to 10,000 cSt.

M11. The method according to any one of embodiment M1 to M10, wherein the calcination product of the polysiloxane oil is formed by mixing particles comprising the expanding agent with one or more polysiloxane oils to form oil coated particles, followed by calcining the oil coated particles at a temperature between 200° C. and 1000° C. for a period of time between 1 minute and 24 hours.

M12. The method according to embodiment M11 wherein the oil coated particles are calcined at a temperature between 250° C. and 650° C.

M13. The method according to embodiment M11 or M12, wherein the oil coated particles are calcined for 0.5 hours to 10 hours.

M14. The method according to any one of embodiments M11 to M13, wherein the oil coated particles are calcined in the presence of oxygen.

M15. The method according to any one of embodiments M11 to M14, wherein the oil coated particles are calcined in the absence of oxygen.

M16. The method according to any one of embodiments M11 to M15, wherein the particles comprising the expanding agent are calcined at a temperature from 100° C. to 1500° C. for a period of time between 1 minute and 24 hours prior to said mixing the particles comprising the expanding agent with the polysiloxane oil to form the oil coated particles.

M17. The method according to any one of embodiment M1 to M16, wherein the capsules comprise from 0.1 wt % to 35 wt % of the calcination product of the polysiloxane oil, based on the total weight of the capsules.

M18. The method according to any one of embodiment M1 to M17, wherein the capsules comprise a plurality of layers, at least one layer comprising the calcination product of the polysiloxane oil.

M19. The method according to any one of embodiment M1 to M18, wherein the cement slurry comprises an amount of expanding agent sufficient to form the expanded set cement transversely compressed between, and bonded to, the first tubular body and the borehole wall, or the first tubular body and the second tubular body.

M20. The method according to embodiment M19, further comprising isolating a zone of the formation adjacent the expanded set cement.

M21. The method according to embodiment M19 or M20, wherein the bond between the first tubular body and the expanded set cement is maintained after fluctuating the dimensions of the first tubular body in response to a temperature change, a pressure change, a mechanical disturbance resulting from a well intervention, or a combination thereof.

M22. The method according to any one of embodiment M to M21, wherein the shell is selected to allow less than 50% relative expansion, based on a total percent expansion of the expanded set cement determined according to API-10B-5, to occur prior to an initial set time for the cement slurry determined according to ASTM C191-04a, and greater than 50% relative expansion to occur after the initial set time for the cement slurry.

M23. The method according to any one of embodiments M1 to M22, wherein the expanding agent comprises calcium oxide, magnesium oxide, calcium sulfate hemihydrate, or a combination thereof.

M24. The method according to any one of embodiments M1 to M23, wherein the coating of the particles with the silica comprises: contacting the particles with a solution of a silicate; and condensing the silicate to form a layer of the silica coating.

M25. The method according to M24, wherein the silicate solution comprises a solvent and the silicate is selected from sodium silicate, potassium silicate, and a combination thereof.

M26. The method according to M24, wherein the silicate comprises sodium silicate.

M27. The method according to M24, wherein the silicate comprises potassium silicate.

M28. The method according to any one of embodiments M1 to M27, wherein the shell comprises an expanding agent particles with a phenolic monomer and an aldehyde.

M29. The method according to any one of embodiments M1 to M28, wherein the phenolic resin coating is a layer formed from polymerizing the phenolic monomer and the aldehyde.

M30. The method according to embodiment M28, wherein the phenolic monomer comprises phenol, and the aldehyde comprises formaldehyde, methylene glycol, trioxane, paraformaldehyde, or a combination thereof.

M31. The method according to any one of embodiments M1 to M30, wherein the expanding agent comprises calcium oxide, magnesium oxide, calcium sulfate hemihydrate, or a combination thereof.

M32. The method according to any one of embodiments M1 to M31, wherein coating of the particles with silica comprises contacting the particles with a solution of a silicate; and condensing the silicate in the coating.

M33. The method according to any one of embodiments M1 to M32, wherein the silicate solution comprises a solvent and the silicate is selected from sodium silicate, potassium silicate, and the combination thereof.

M34. The method according to any one of embodiments M1 to M33, wherein the slurry comprises from 0.1 to 20 weight percent of the silica-coated particles, based on the total weight of the cement and the silica-coated particles.

M35. The method according to any one of the embodiments M1 to M34, wherein the coating of the particles with the phenolic resin comprises: contacting the expanding agent particles with a phenolic monomer and an aldehyde; and polymerizing the phenolic monomer and the aldehyde to form a layer of the phenolic resin coating.

M36. The method according to embodiment M35, wherein the phenolic monomer comprises phenol.

M37. The method according to any one of the embodiments M35 to M36, wherein the aldehyde comprises formaldehyde, methylene glycol, trioxane, paraformaldehyde, or a combination thereof.

M38. The method according to any one of the embodiments M36 to M37, wherein the phenolic monomer comprises a substituted phenol.

M39. The method according to any one of the embodiments M28-M38, wherein the aldehyde has the formula R—CHO wherein R is a hydrocarbyl having from 2 to 10 carbon atoms, or a combination thereof.

M40. The method according to any one of the embodiments M28-M39, wherein a molar ratio of the aldehyde to the phenolic monomer is less than 1.

M41. The method according to any one of the embodiments M28-M40, wherein the aldehyde, the phenolic monomer, or a combination thereof, comprises an aqueous solution.

M42. The method according to any one of the embodiments M35-M41, comprising crosslinking the phenolic resin in the coating.

M43. The method according to any one of the embodiments M28-41, comprising spraying the phenolic monomer and the aldehyde on the particles.

M44. The method according to any one of the embodiments M28-43, wherein the dry blend or slurry comprises from 0.1 to 20 weight percent of the phenolic resin-coated particles, based on the total weight of the cement and the phenolic resin-coated particles.

M45. The method according to any one of the embodiments M28-44, wherein the phenolic resin comprises a novolac.

M46. The method according to any one of the embodiments M45 further comprising crosslinking the resin.

M47. The method according to any one of the embodiments M28-46, wherein the phenolic resin comprises a resole.

M48. The method according to any one of the embodiments M28-47 further comprising crosslinking the resin.

S1. A system for cementing a subterranean well in an annulus between a casing disposed within a borehole and a formation comprising a cement slurry comprising water, hydraulic cement, and a plurality of capsules comprising an expanding agent at least partially surrounded by a shell comprising a phenolic resin, a silica, a calcination product of a polysiloxane oil, or combinations thereof; and a pumping system to place a stage of the slurry in the annulus.

S2. The system according to embodiment S1, wherein the shell is at least partially water permeable.

S3. The system according to embodiment S1 or S2, wherein the expanding agent comprises calcium oxide, magnesium oxide, calcium sulfate hemihydrate, or a combination thereof.

S4. The system according to any one of embodiments S1 to S3, wherein the expanding agent is present in the cement slurry at a concentration between 0.1 weight percent and 35 weight percent, based on the total weight of the hydraulic cement present.

S5. The system according to any one of embodiments S1 to S4, wherein an average particle size of the particles of the expanding agent is between 0.1 µm and 500 µm.

S6. The system according to any one of embodiments S1 to S5, wherein an average particle size of the capsules is between 1 µm and 1000 µm.

S7. The system according to any one of embodiments S1 to S6, wherein the calcination product is produced by calcination of polydimethylsiloxane, polyphenylmethylsiloxane, polydiphenylsiloxane, or combinations thereof, having a kinematic viscosity from 100 to 100,000 cSt.

S8. The system according to embodiment S7, wherein the calcination product is produced by calcination of polydimethylsiloxane, polyphenylmethylsiloxane, polydiphenylsiloxane, or combinations thereof, having a kinematic viscosity from 1,000 to 10,000 cSt.

S9. The system according to any one of embodiments S1 to S8, wherein the calcination product of the polysiloxane oil is formed by mixing particles comprising the expanding agent with one or more polysiloxane oils to form oil coated particles, followed by calcining the oil coated particles at a temperature between 200° C. and 1000° C. for a period of time between 1 minute and 24 hours.

S10. The system according to embodiment S9 wherein the oil coated particles are calcined at a temperature between 250° C. and 650° C.

S11. The system according to embodiment S9 or S10, wherein the oil coated particles are calcined for 0.5 hours to 10 hours.

S12. The system according to any one of embodiments S9 to S11, wherein the oil coated particles are calcined in the presence of oxygen.

S13. The system according to any one of embodiments S9 to S11, wherein the oil coated particles are calcined in the absence of oxygen.

S14. The system according to any one of embodiments S9 to S13, wherein the particles comprising the expanding agent are calcined at a temperature from 100° C. to 1500° C. for a period of time between 1 minute and 24 hours prior to said mixing the particles comprising the expanding agent with the polysiloxane oil to form the oil coated particles.

S15. The system according to any one of embodiments S1 to S14, wherein the capsules comprise from 0.1 wt % to 35 wt % of the calcination product of the polysiloxane oil, based on the total weight of the capsules.

S16. The system according to any one of embodiments 51 to S15, wherein the capsules comprise a plurality of layers, at least one layer comprising the calcination product of the polysiloxane oil.

S17. The system according to any one of embodiments S1 to S16, wherein the cement slurry comprises an amount of expanding agent sufficient to form the expanded set cement transversely compressed between, and bonded to, the first tubular body and the borehole wall, or the first tubular body and the second tubular body.

S18. The system according to embodiment S17, further comprising isolating a zone of the formation adjacent the expanded set cement.

S19. The system according to embodiment S17 or S18, wherein the bond between the first tubular body and the expanded set cement is maintained after fluctuating the dimensions of the first tubular body in response to a temperature change, a pressure change, a mechanical disturbance resulting from a well intervention, or a combination thereof.

S20. The system according to any one of embodiments S1 to S19, wherein the shell is selected to allow less than 50% relative expansion, based on a total percent expansion of the expanded set cement determined according to API-10B-5, to occur prior to an initial set time for the cement slurry determined according to ASTM C191-04a, and greater than 50% relative expansion to occur after the initial set time for the cement slurry.

EXAMPLES

The following examples are provided to more fully illustrate the disclosure. These examples are not intended to limit the scope of the disclosure in any way.

To determine the delay provided by the outer layer, the hydration heat of the material was measured over time after contacting the capsules with water. The heat released upon hydration results from the following reactions:

CaO+H2O→Ca(OH)2, 1150 J/g     (I)

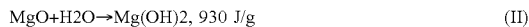
MgO+H2O→Mg(OH)2, 930 J/g     (II)

Figure 5:
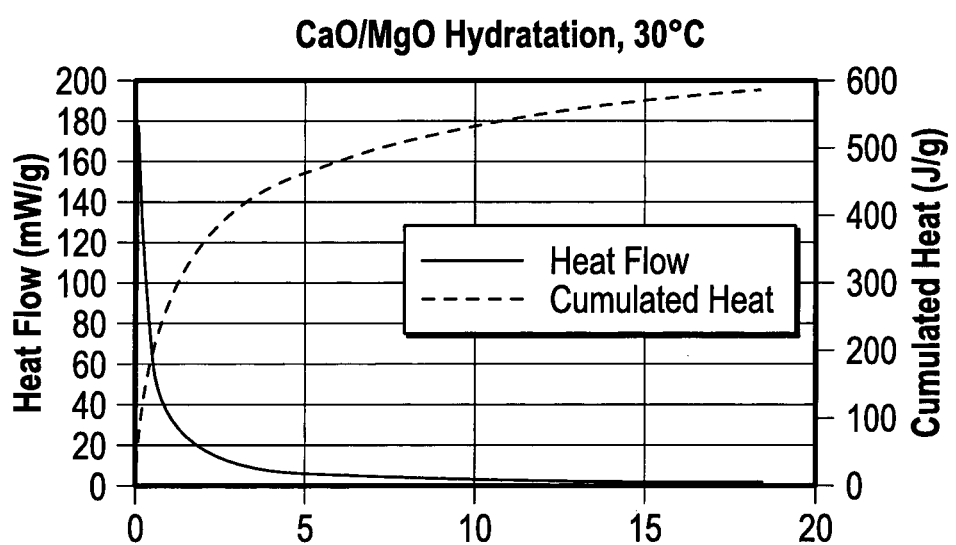
FIG. 5 is a graph showing a calorimetry curve for hydration of a comparative untreated expanding agent.
Figure 8:
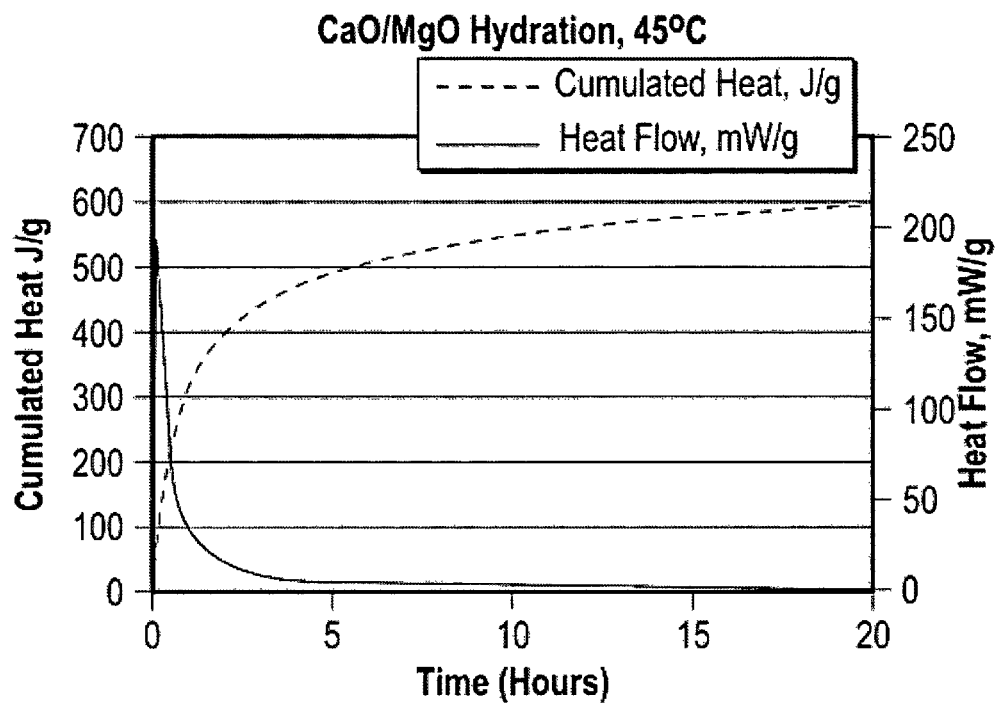
FIG. 8 is a graph showing a calorimetry curve for hydration of an exemplary encapsulated expanding agent according to embodiments disclosed herein.
Figure 9:
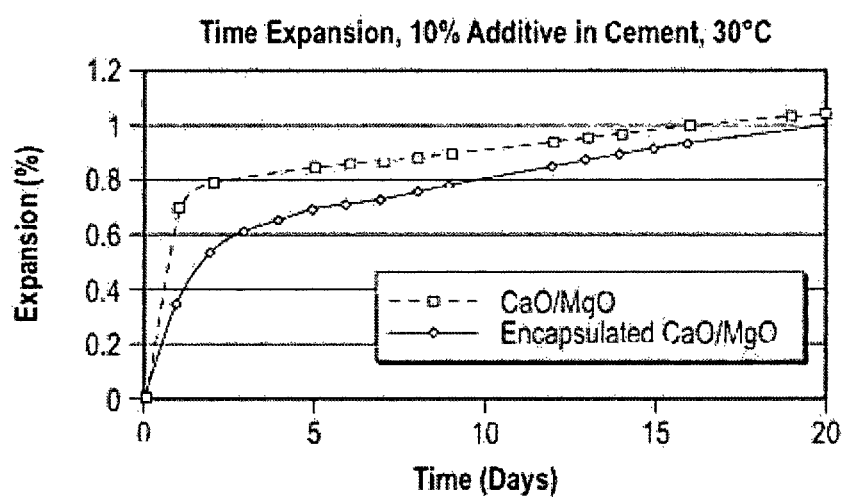
FIG. 9 is a graph showing the expansion of comparative and exemplary cement slurries according to embodiments disclosed herein, evaluated according to API 10B-5.

As shown in FIG. 5, in comparative Example 1, when a comparative untreated, non-encapsulated expanding agent is contacted with water, at lower temperatures, i.e., below 60° C., the heat is mainly provided by reaction (I) during the first hours and a plateau may be reached within 15-20 hours. With untreated material, a plateau may be reached within 10 hours as illustrated in FIG. 8. When it was protected by the silica coating, the hydration was much slower, and a plateau was reached after 70 hours, as shown in FIG. 12.

Exemplary capsules were prepared as Example 2 by mixing a pre-treated CaO/MgO, which was first pre-calcined at 1000° C. to remove water, with 5.3 weight percent polydimethyl silane (PDMS) having a kinematic viscosity or 1000 cSt at 25° C. The oil-coated particles were then calcined at 355° C. for 2 hours to form the silica coated particles ("capsules").

Figure 12:
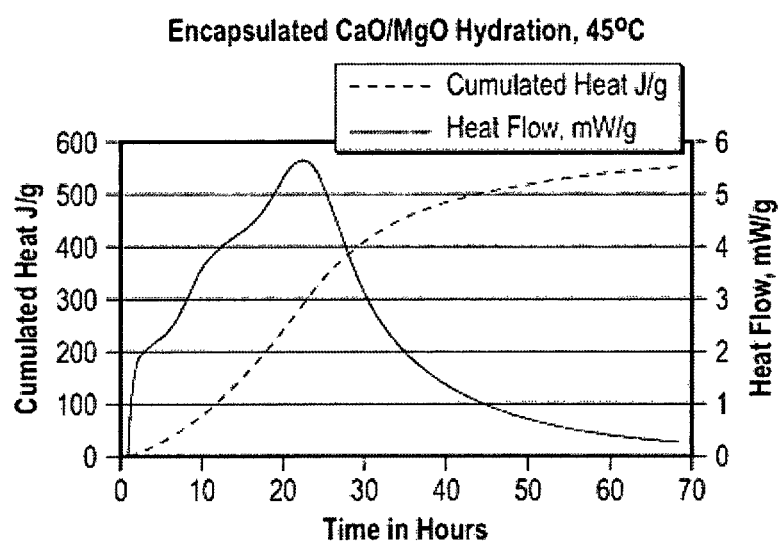
FIG. 12 is a calorimetry curve showing the hydration of silica-coated CaO/MgO particles in an example according to embodiments of the disclosure.
Figure 13:
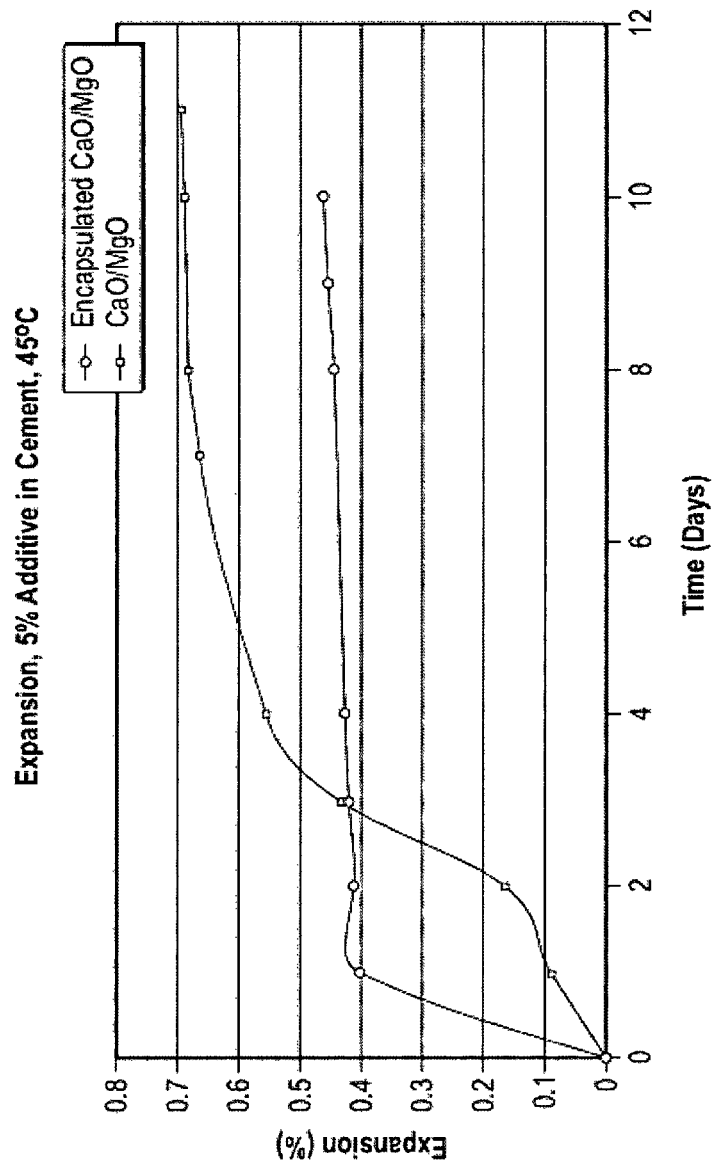
FIG. 13 shows the confined cement expansion of a hydraulic cement slurry prepared with the silica-coated CaO/MgO particles of FIG. 7 in an example according to embodiments of the disclosure.

As shown in FIG. 12, contacting the capsules prepared according to Example 2 results in a much slower hydration, with a plateau being reached after more than 60 hours.

Similar cement slurries were formulated for expansion testing according to API testing via linear expansion cells using API 10B-5, or ISO 10426-5. Comparative Example 3 utilized the untreated CaO/MgO evaluated in Comparative Example 1, and Example 4, employed the capsules evaluated in Example 2. The cement slurries were prepared as described in Table 1 and subjected to testing according to API 10B-5.

TABLE 1

Cement slurries for showing effect of expanding agent encapsulation

| Component | Example 1 - Slurry A Untreated CaO/MgO | Example 2 - Slurry B Siloxane Coated CaO/MgO |
|---|---|---|
| Class G cement (mass by weight of cement) | 746 g | 749 g |
| Untreated (dry) CaO/MgO | 75 g | — |
| Siloxane coated CaO/MgO | — | 75 g |
| Fluid loss | 2.2 | 2.2 g |
| Antifoam | 3.0 g | 3.0 g |
| Dispersant | 4.4 g | 4.4 g |
| Anti-settling | 1.5 g | 1.5 g |
| Retarder | 2.4 g | — |
| Water | 339 g | 334 g |

Figure 6:
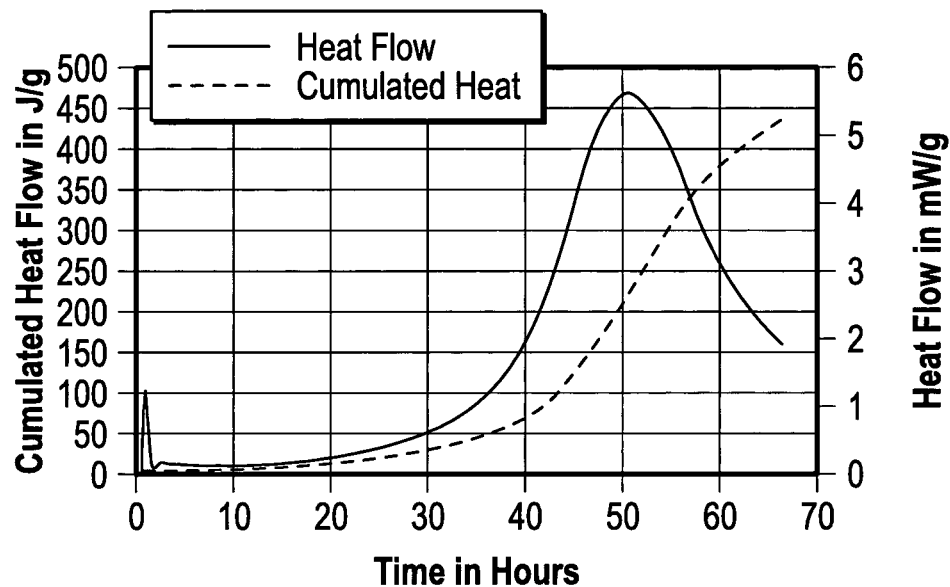
FIG. 6 is a graph showing a calorimetry curve for hydration of an exemplary encapsulated expanding agent according to embodiments disclosed herein.

Exemplary capsules of the CaO/MgO treated with 8 wt % of a phenolic resin, based on the weight of the CaO/MgO, were also evaluated. As shown in FIG. 6, contacting the capsules prepared according to Example 2 results in a much slower hydration, with a plateau being reached after more than 70 hours.

As shown in FIG. 6, the comparative untreated expanding agent achieved an expansion plateau after 2 days. In contrast, the exemplary encapsulated expanding agent showed expansion which increased at a much slower rate, with a delay or induction period. The steady state was reached after 5-6 days.

Cement Slurries with Non-Encapsulated and Encapsulated CaO/MgO:

Cement slurries A and B were formulated for expansion testing according to API testing via linear expansion cells using API 10B-5, or ISO 10426-5, as described above. Cement slurry A utilized the untreated CaO/MgO evaluated in Comparative Example 1, and Example 4 employed the capsules evaluated in Example 2. The cement slurries were prepared as described in Table 2 and subjected to testing as described above and/or according to API 10B-5.

TABLE 2

Cement slurries for showing effect of expanding agent encapsulation

| Component | Example 3 - Slurry A Untreated CaO/MgO | Example 4 - Slurry B Resin-Treated CaO/MgO |
|---|---|---|
| Class G cement (mass by weight of cement) | 745 g | 743 g |
| Untreated (dry) CaO/MgO | 75 g | — |
| Resin-treated CaO/MgO | — | 80 g |
| Fluid loss | 0 g | 2.2 g |
| Antifoam | 3.2 g | 3.0 g |
| Dispersant | 4.8 g | 4.4 g |
| Anti-settling | 1.5 g | 1.5 g |
| Retarder | 0 g | — |
| Water | 335 g | 332 g |

Figure 7:
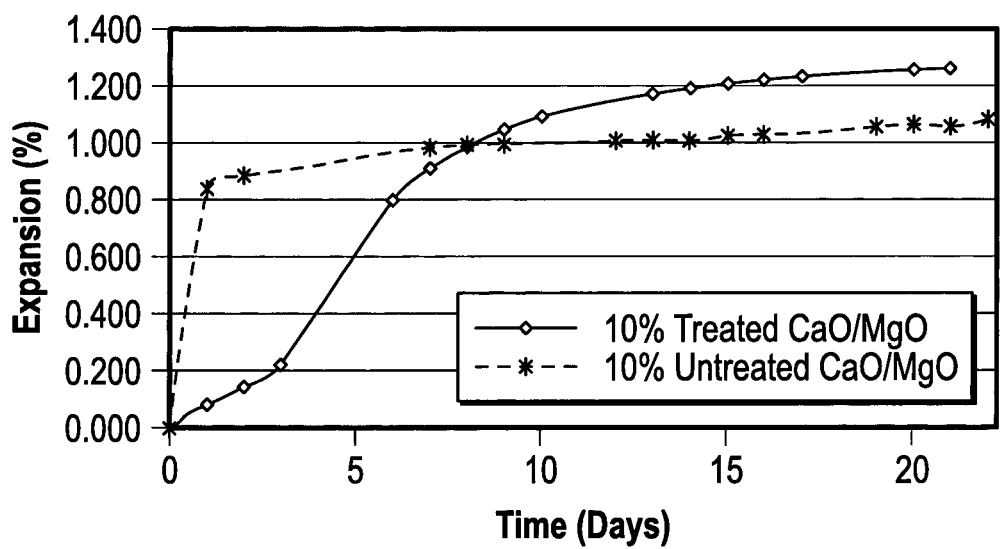
FIG. 7 is a graph showing the expansion of comparative and exemplary cement.

As shown in FIG. 7, the comparative untreated expanding agent (Slurry A) achieved an expansion plateau after 2 days. In contrast, the exemplary phenolic resin-encapsulated expanding agent (Slurry B) showed expansion which increased at a much slower rate, with a delay or induction period of 4 days during which very little expansion occurred. Then a plateau was reached after about 15 days, that was higher than that of the slurry with the untreated expanding agent.

In embodiments, the cement slurry according to the instant disclosure is prepared which comprises water, hydraulic cement and capsules comprising a core of an expanding agent at least partially surrounded by (e.g., encapsulated within) a water-permeable shell (see FIGS. 10A and 10B), e.g., silica. The slurry is then placed in an annular region between a first tubular body (e.g., the well casing) and a borehole wall or a second tubular body (see FIGS. 2 and 3). The slurry is then allowed to at least partially set e.g., allowed to harden, to form a set cement, e.g., allowed to set for a time greater than or equal to the first or initial set time measured for the cement slurry when determined according to ASTM C191-04a, or an equivalent thereof. In addition, in some embodiments the method includes infiltrating a portion of the water present in the slurry into the capsules which, in embodiments, hydrates the expanding agent causing the expanding agent to expand. In embodiments, this expansion may cause the water permeable shell to rupture, thus releasing the expanding agent or reducing the inhibition of the water contacting the expanding agent. Expansion of the expanding agent forms an expanded set cement within the annular region. In embodiments, the expanded set cement is radially pre-stressed within the cement sheath, i.e., the expanded set cement is transversely compressed between the first tubular body and the borehole wall, or the first tubular body and the second tubular body.

In some embodiments, the water permeability of the shell may depend on deformations or discontinues within the shell so that the shell impedes infiltration, but does not entirely eliminate infiltration of water into the core for a period of time; after which the expanding agent expands in an amount sufficient to increase and thus accelerate the hydration of the expanding agent to form the expanded set cement.

Figure 10A:
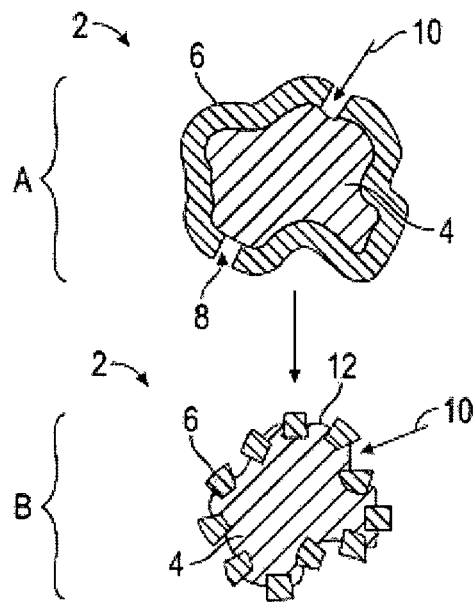
FIGS. 10A and 10B are schematic diagrams showing capsules having a matrix island arrangement according to embodiments of the disclosure.

In the figures, like numerals are used to designate like parts. As shown in FIG. 10A, the capsule 2 comprises a core 4 comprising an expanding agent at least partially surrounded by a silica shell 6 comprising one or more discontinuities or imperfections 8. In the "A" stage, the water infiltrates (shown by arrow 10) through the imperfections 8 to contact the expanding material present in core 4, thereby hydrating and initiating expansion of the expanding agent. In the "B" stage, the core 4 is expanded and has ruptured the shell 6, thereby creating one or more enlarged openings 12 to activate the expanding agent to accelerate any further water infiltration 10, hydration and expansion of the core 4. The creation of the enlarged openings 12, whether by enlarging the imperfections 8 or rupturing the shell 6 or otherwise forming new openings, is referred to herein as "activating" the expanding agent.

Figure 10B:
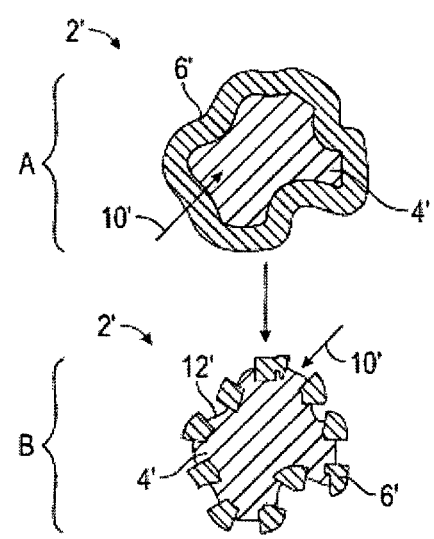

As shown in FIG. 10B, the capsule 2' comprises a core 4' comprising an expanding agent at least partially surrounded by a silica shell 6' comprising a water permeable component or a component which has become water permeable, e.g., by dissolution or other means under downhole conditions. In the "A" stage, the water infiltrates (shown by arrow 10') through the permeable shell 6' to contact the expanding material present in core 4', thereby hydrating and initiating expansion of the expanding agent. In the "B" stage, the core 4' is expanded and has ruptured the shell 6, thereby creating one or more enlarged openings 12' to activate the expanding agent to accelerate any further water infiltration 10', hydration and expansion of the core 4'. The enlarged openings 12' can be created to activate the expanding agent by dissolution of portion(s) of the shell 6', rupturing the shell 6' or otherwise forming the openings.

Figure 11:
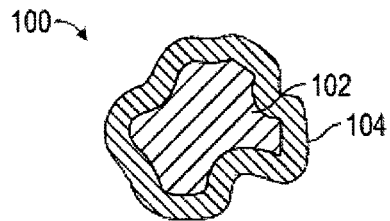
FIG. 11 shows a capsule having a single core-shell arrangement according to embodiments of the disclosure.

For all aspects, the encapsulated expanding agent may be encapsulated by a silica material which isolates the agent at (the Earth's) surface conditions, but releases the expanding agent within the borehole, e.g., by permeation of water through the shell and/or rupture or degradation or dissolution of the shell. In some embodiments, as shown in FIG. 11, the capsules comprise or consist essentially of capsules 100 having a single-core shell configuration, in which the expanding agent is arranged as a single core 102 at least partially surrounded by the silica shell 104.

Activation of an encapsulated expanding agent over time may be brought about by means of a silica coating material which dissolves slowly or undergoes chemical degradation under conditions encountered in the borehole, thereby making the coating permeable to allow the infiltration of water and or leading to rupture of the shell of core-shell type particles. For example, both fumed silica and precipitated silica become water soluble under the high pH (i.e., pH>10) present within the hydraulic cement as it sets.

Hydraulic cement slurries were formulated, one with untreated CaO/MgO, and one with the silica-encapsulated CaO/MgO, as shown in Table 3 below:

TABLE 3

| Component | Formulation with untreated CaO/MgO | Formulation with encapsulated CaO/MgO |
|---|---|---|
| Cement, class G | 759 g | 760 g |
| CaO/MgO (untreated or treated) | 38 g | 38 g |
| Fluid loss agent | 0 g | 0.8 g |
| Antifoam agent | 3.0 g | 3.0 g |
| Dispersant | 6.6 g | 6.6 g |
| Anti-settling agent | 2.3 g | 2.3 g |
| Water | 339 g | 339 g |

The expansion of the cement was then measured at 45° F. using an API linear expansion cell (API 10B-5, or ISO 10426-5). As shown in FIG. 8, with untreated CaO/MgO, the expansion reached a plateau after 1 day. However, with the encapsulated CaO/MgO, very little expansion was observed during the first 2 days, and then expansion was observed over 2-3 days.

In some embodiments herein, an encapsulated expanding agent having utility in a cement slurry, e.g., a well cementing slurry, comprises particles of an expanding agent coated with a phenolic resin.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

We claim:

1. A method, comprising:
   coating expanding agent particles with a phenolic resin, forming a capsule that becomes water permeable when combined with a hydraulic cement and water;
   combining the coated expanding agent particles with water and hydraulic cement to form a cement slurry for cementing a well, thereby causing the water to infiltrate the phenolic resin coating, thereby causing the expanding agent particles to expand and rupture the capsule.

2. The method of claim 1, wherein the expanding agent particles have an average particle size between 0.1 μM and 500 μm, and the coated particles have an average particle size between 1 μm and 1000 μm.

3. The method of claim 1, further comprising coating the expanding agent particles with a polysiloxane oil comprising polydimethylsiloxane, polyphenylmethylsiloxane, polydiphenylsiloxane, or combinations thereof, having a kinematic viscosity from 100 to 100,000 cSt.

4. The method of claim 1, wherein the coating comprises mixing particles comprising the expanding agent with one or more polysiloxane oils to form oil-coated particles, followed by calcining the oil-coated particles at a temperature between 200° C. and 1000° C., for a period of time between 1 minute and 24 hours.

5. The method of claim 4, wherein the particles comprising the expanding agent are calcined at a temperature from 100° C. to 1500° C. for a period of time between 1 minute and 24 hours prior to said mixing the particles comprising the expanding agent with the polysiloxane oil to form the oil-coated particles.

6. The method of claim 3, wherein the coated particles comprise from 0.1 wt % to 35 wt % of the calcination product of the polysiloxane oil, based on the total weight of the coated particles.

7. The method of claim 3, wherein the coated particles comprise a plurality of layers, at least one layer comprising the calcination product of the polysiloxane oil.

8. The method of claim 1, wherein coating particles comprises:
contacting the expanding agent particles with a phenolic monomer and an aldehyde; and
polymerizing the phenolic monomer and the aldehyde to form a layer of the phenolic resin coating.

9. The method of claim 8, wherein the phenolic monomer comprises phenol, and the aldehyde comprises formaldehyde, methylene glycol, trioxane, paraformaldehyde, or a combination thereof.

10. The method of claim 1, further comprising dry blending the coated particles and the hydraulic cement, and mixing the dry blend with the mix water.

11. The method according to claim 1, wherein the expanding agent comprises calcium oxide, magnesium oxide, calcium sulfate hemihydrate, or a combination thereof.

12. The method of claim 1, further comprising coating the expanding agent particles with silica by contacting the particles with a silicate solution; and condensing the silicate in the coating.

13. The method of claim 12, wherein the silicate solution comprises a solvent and the silicate is selected from sodium silicate, potassium silicate, and the combination thereof.

14. The method of claim 1, further comprising pumping the well cementing slurry in an annular region of the well.

15. The method of claim 1, further comprising:
(ii) placing the well cementing slurry in an annular region of the well around a tubular member;
(iii) hardening the well cementing slurry to form an at least partially set cement; and
(iv) hydrating the expanding agent to form an expanded set cement within the annular region.

16. The method according to claim 15, wherein the well cementing slurry comprises an amount of expanding agent sufficient to form the expanded set cement transversely compressed within the annular region, and optionally isolating a zone of the formation adjacent the expanded set cement.

17. The method according to claim 15, further comprising:
(a) preparing a proposed well cementing slurry formulation comprising the water, cement, and encapsulated expanding agent;
(b) determining that the proposed well cementing slurry formulation exhibits expansion characteristics of less than 50% relative expansion, based on a total percent expansion of the expanded set cement determined according to API-11B-5, prior to an initial set time for the proposed well cementing slurry formulation, determined according to ASTM C191-04aC, and greater than 50% relative expansion after the initial set time for the proposed well cementing slurry formulation, wherein the initial set time and relative expansion are determined at a maximum downhole pressure and temperature in the annular region up to 1000 C, or at 1000 C if the maximum temperature of the annular region is greater than 1000 C; and
(c) preparing the well cementing slurry for the placing (ii), hardening (iii), and hydrating (iv), in accordance with the proposed well cementing slurry formulation exhibiting the characteristics determined in (b).

* * * * *